US012220713B2

(12) United States Patent
Jurkovic et al.

(10) Patent No.: US 12,220,713 B2
(45) Date of Patent: Feb. 11, 2025

(54) AIR MASKING NOZZLE

(71) Applicant: NIKE, Inc., Beaverton, OR (US)

(72) Inventors: Dragan Jurkovic, Taichung (TW); Che-Sheng Chen, Huwei Township, Yunlin County (TW); Chien-Liang Yeh, Changhua (TW)

(73) Assignee: NIKE, Inc., Beaverton, OR (US)

( * ) Notice: Subject to any disclaimer, the term of this patent is extended or adjusted under 35 U.S.C. 154(b) by 18 days.

(21) Appl. No.: 17/548,069

(22) Filed: Dec. 10, 2021

(65) Prior Publication Data

US 2022/0097083 A1 Mar. 31, 2022

Related U.S. Application Data

(62) Division of application No. 15/965,235, filed on Apr. 27, 2018, now abandoned.

(Continued)

(51) Int. Cl.
*B05B 1/28* (2006.01)
*A43D 25/18* (2006.01)

(Continued)

(52) U.S. Cl.
CPC ............ *B05B 1/005* (2013.01); *A43D 25/183* (2013.01); *A43D 119/00* (2013.01); *B05B 1/28* (2013.01); *B05B 7/00* (2013.01); *B05B 12/004* (2013.01); *B05B 12/18* (2018.02); *B05B 12/34* (2018.02); *B05B 13/0431* (2013.01); *B05B 15/40* (2018.02)

(58) Field of Classification Search
None
See application file for complete search history.

(56) References Cited

U.S. PATENT DOCUMENTS 2,088,542 A 7/1937 Westin
2,438,471 A 3/1948 Ball (Continued)

FOREIGN PATENT DOCUMENTS

CN 102671792 A 9/2012
DE 4426984 A1 2/1996

(Continued)

OTHER PUBLICATIONS

Office Action received for European Application No. 23178343.2, mailed on Jul. 2, 2024, 4 pages.

(Continued)

*Primary Examiner* — Binu Thomas
(74) *Attorney, Agent, or Firm* — SHOOK, HARDY & BACON L.L.P.

(57) ABSTRACT

A nozzle dispenses a material, such as an adhesive, primer, paint, or other coating, through a dispensing port on to a substrate. The spray pattern provided by the nozzle defines, at least in part, an application pattern of the material on to the substrate. An air mask port integral with the nozzle or a separate nozzle expels a mask stream of pressurized gas. The mask stream projects toward the substrate to aid in limiting an application of the material beyond an application line on the substrate. The air-mask port and the dispensing port may be moved relative to the substrate and/or the application line such that the mask stream provides a barrier to the material being applied.

10 Claims, 15 Drawing Sheets

Related U.S. Application Data

(60) Provisional application No. 62/513,134, filed on May 31, 2017.

(51) Int. Cl.

| | |
|---|---|
| ***A43D 119/00*** | (2006.01) |
| ***B05B 1/00*** | (2006.01) |
| ***B05B 7/00*** | (2006.01) |
| ***B05B 12/00*** | (2018.01) |
| ***B05B 12/18*** | (2018.01) |
| ***B05B 12/34*** | (2018.01) |
| *B05B 13/04* | (2006.01) |
| *B05B 15/40* | (2018.01) |

(56) References Cited

U.S. PATENT DOCUMENTS

| | | | | |
|---|---|---|---|---|
| 3,946,905 | A | 3/1976 | Cogliano | |
| 5,175,018 | A | 12/1992 | Lee et al. | |
| 5,393,345 | A * | 2/1995 | Smith | B05B 12/18 118/326 |
| 5,452,856 | A * | 9/1995 | Pritchard | B05B 7/08 239/300 |
| 5,690,740 | A * | 11/1997 | Smith | B05B 12/18 118/300 |
| 6,318,642 | B1 * | 11/2001 | Goenka | B05B 12/18 239/296 |
| 6,332,923 | B1 | 12/2001 | Crawley et al. | |
| 2003/0017276 | A1 | 1/2003 | Yamada et al. | |
| 2005/0001061 | A1 * | 1/2005 | Mauchle | B05B 5/032 239/290 |
| 2005/0077384 | A1 | 4/2005 | Tani et al. | |
| 2012/0231174 | A1 | 9/2012 | Friese | |
| 2014/0090673 | A1 | 4/2014 | Atsumi et al. | |
| 2015/0327630 | A1 * | 11/2015 | Lim | B05B 12/22 239/104 |
| 2017/0361466 | A1 | 12/2017 | Anderson | |
| 2018/0345300 | A1 | 12/2018 | Jurkovic et al. | |

FOREIGN PATENT DOCUMENTS

| | | | |
|---|---|---|---|
| EP | 1295648 | A1 | 3/2003 |
| JP | H0857402 | A | 3/1996 |
| JP | 2000-197835 | A | 7/2000 |
| TW | 201600175 | A | 1/2016 |
| WO | 2008/047205 | A2 | 4/2008 |
| WO | 2013/165181 | A1 | 11/2013 |
| WO | 2015/172996 | A1 | 11/2015 |

OTHER PUBLICATIONS

Extended European Search Report received for European Patent Application No. 23178343.2, mailed on Jul. 11, 2023, 8 pages.

Intention to Grant received for European Patent Application No. 18732581.6, mailed on Jan. 4, 2023, 7 pages.

* cited by examiner

AIR MASKING NOZZLE

CROSS-REFERENCE TO RELATED APPLICATIONS

This application is a divisional of co-pending U.S. application Ser. No. 15/965,235, filed on Apr. 27, 2018, and entitled "AIR MASKING NOZZLE," which claims the benefit of U.S. Provisional Application No. 62/513,134, filed on May 31, 2017, and entitled "AIR MASKING NOZZLE." The entirety of each of the aforementioned applications is incorporated by reference herein.

TECHNICAL FIELD

Controlled material application from a nozzle.

BACKGROUND

Materials, such as adhesive, paint, dye, or coatings, may be applied to a substrate with a spraying action. The spraying action may be controlled, in part, through a selection of a spray pattern emanating from a nozzle. The spray pattern may vary in coverage based on a variety of factors, such as material characteristics (e.g., viscosity), pressure, volume, time, distance from substrate, and the like. Because of this variability in the spray pattern, physically covering a portion of the substrate not intended to receive the material has been used to prevent over spraying and referred to as masking.

BRIEF SUMMARY

Aspects herein contemplate a method of applying material from a nozzle having an air-mask port and a dispensing port. The method includes positioning the nozzle relative to a substrate to which material is to be applied from the dispensing port and then dispensing the material from the dispensing port. While dispensing the material from the dispensing port, the method includes discharging gas from the air-mask port. An alignment axis extends through the air-mask port and the dispensing port of the nozzle. Stated differently, the alignment axis extends between an origin of the carrier stream and an origin of the masking stream. The method continues with moving the nozzle along an application line of the substrate such that the alignment axis intersects the application line at an angle range of 75 degrees to 105 degrees while dispensing the material from the dispensing port and while discharging the gas from the air-mask port.

Another aspect contemplates a nozzle comprising a dispensing port centrally positioned on the nozzle and effective to dispense a material by a pressurized fluid stream through the nozzle at the dispensing port. The nozzle also includes an air-mask port that is peripherally positioned on the nozzle relative to the dispensing port and effective to expel a pressurized fluid stream through the nozzle at the air-mask port. A cross-section area of the air-mask port in a horizontal plane is less than a cross-sectional area of the dispensing port in the horizontal plane.

This summary is provided to enlighten and not limit the scope of methods and systems provided hereafter in complete detail.

DESCRIPTION OF THE DRAWINGS

The present invention is described in detail herein with reference to the attached drawing figures, wherein.

DETAILED DESCRIPTION

Figure 1:
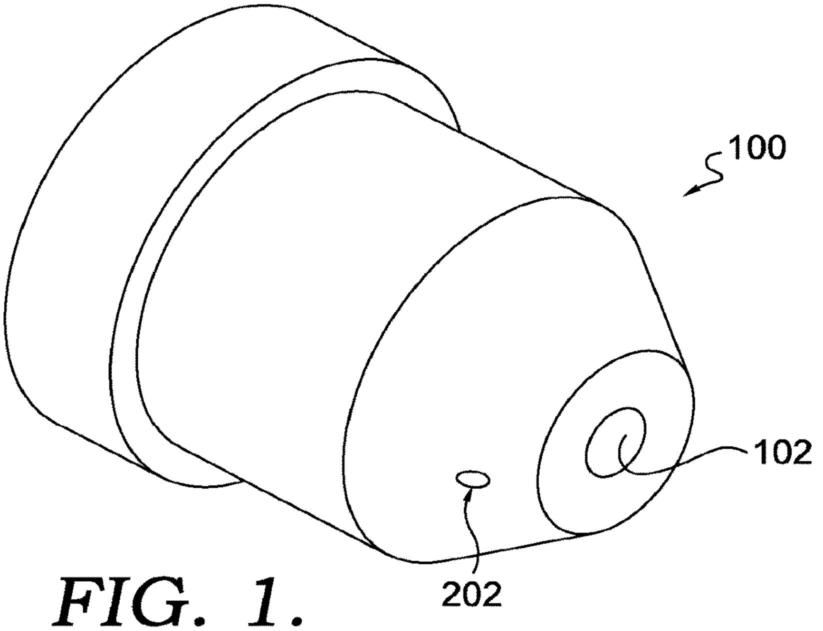
FIG. 1 depicts a perspective view of an exemplary nozzle having an air-mask port, in accordance with aspects hereof.

A nozzle directs sprayed material at an intended target. For example, a nozzle is effective to direct compressed air in a fluid stream to atomize or propel a material, such as an ink, paint, adhesive, or other liquid or powder material at a target. Traditional nozzles are comprised of an air cap. The air cap is a component that can be responsible for defining the spray pattern.

Some air caps are referred to as external mixing spray caps. An external mixing spray cap includes a series of jets that expel compressed air in defined streams that interact with the spray material (e.g., ink, paint, adhesive, primer) in close proximity to the output of the spray material. The interaction between the spray material and the defined streams of air transport the spray material towards a target as a carrier stream. The spray material is often atomized by the streams of air for transport to the target. A spray line extends from the air cap to the target. The spray line defines an axis about which the spray pattern is formed. Because the spray pattern may radially extend outwardly from the spray line as the material extends along the spray line from the air cap, the spray line will be used as a reference for a straight line between the application source (e.g., nozzle) and the target.

An external air cap may also be comprised of an air horn. An air horn expels a compressed fluid stream, such as air, at an angle relative to the spray line to shape the carrier stream (i.e., to shape the spray pattern). Air horn streams intersect the spray line within a few millimeters of the spray material being atomized by the carrier stream. This intersection, the angle of intersection, the relative volume of fluid in the air horn stream, and the relative speed of the fluid in the air horn stream all can contribute to the resulting spray pattern of the carrier stream.

Other air caps are referred to as internal mixing air caps. An internal mixing air cap atomizes the spray material within the nozzle prior to discharging the spray material from the nozzle. This is in contrast to an external mixing air cap that atomizes the spray material after the spray material is discharged from the air cap.

While various air caps have been used in practice with specific spray patterns, the adjustment of the spray pattern has traditionally occurred in close proximity (e.g., 1-5 millimeters) to a point of spray material discharge from the nozzle or where the spray material has been atomized by the carrier stream. For example, the air horn streams of an external mixing air cap leverage an air stream to shape the resulting spray pattern, but the interaction of the air horn stream and the carrier stream occurs in close proximity (e.g., 1-5 millimeters) to the spray material atomization point.

While traditional spray pattern forming, such as through the use of an air horn, provides a macro-level control over spray material deposition location, additional control of spray material deposition may be implemented in exemplary aspects. For example, aspects herein contemplate an air-mask port that expels a stream of air, a masking stream, in a direction that intersects with the carrier stream near or at the substrate to be sprayed. The air-mask port, in an exemplary aspect, forms a masking axis that extends between the air-mask port and a point of intersection at the substrate. The masking axis, for a cylindrical air-mask port is axially aligned with a longitudinal axis of the cylinder volume that extends through an origin of a circular cross section of the cylindrical air-mask port. The masking axis is substantially parallel (e.g., within 10 degrees) with the spray axis in an aspect. In yet another aspect, the masking axis is parallel with the spray axis. The masking stream serves as a mask to limit or prevent material being transported by the carrier stream to extend through the masking stream. Stated differently, the masking stream is contemplated to provide a barrier for controlling a spray pattern at the substrate that provides a greater degree of control and effectiveness than a traditional nozzle or air horn configuration.

Aspects hereof contemplated a method of applying material from a nozzle. The method comprises positioning the nozzle relative to a substrate to which material (e.g., adhesive, colorant, and primer) is to be applied from a dispensing port of the nozzle. The method includes dispensing the material from the dispensing port. A dispensing axis extends through the dispensing port in a direction the material is dispensed (e.g., in a line extending between the nozzle and the substrate in a material flow direction). Concurrent to dispensing the material from the dispensing port, the method includes discharging gas from an air-mask port. The air-mask port may be a different nozzle or the same nozzle has the nozzle comprised of the dispensing port. A masking axis extends through the air-mask port in a direction the gas is discharged toward the substrate (e.g., in a line extending from the air-mask port to the substrate in a gas-flow direction). In this example, an alignment axis extends through the dispensing port and the air-mask port (e.g., an alignment axis intersects the dispensing axis and the masking axis). While dispensing the material and discharging the gas, moving the nozzle, such as through a multi-axis robot controlled by a computing system, along an application line of the substrate such that the dispensing axis intersects with the masking axis within 5 cm (e.g., 5 cm above or below) of a substrate application surface of the substrate.

Another aspect herein contemplates a method of applying material from a single nozzle having an air-mask port and a dispensing port. The method includes positioning the nozzle relative to a substrate (e.g., a component of an article of footwear or any material, such as a knit, woven, braided, non-woven material) to which material (e.g., adhesive, primer, paint, and dye) is to be applied from the dispensing port and then dispensing the material from the dispensing port. While dispensing the material from the dispensing port, the method includes discharging gas from the air-mask port. An alignment axis extends through the air-mask port and the dispensing port of the nozzle. Stated differently, the alignment axis extends between an origin of the carrier stream and an origin of the masking stream. The method continues with moving the nozzle along an application line of the substrate such that the alignment axis intersects the application line at an angle range of 75 degrees to 105 degrees while dispensing the material from the dispensing port and while discharging the gas from the air-mask port.

Another aspect contemplates a nozzle comprising a dispensing port centrally positioned on the nozzle and effective to dispense a material by a pressurized fluid stream through the nozzle at the dispensing port. The nozzle also includes an air-mask port that is peripherally positioned on the nozzle relative to the dispensing port and effective to expel a pressurized fluid stream through the nozzle at the air-mask port. A cross-section area of the air-mask port in a horizontal plane (e.g., a plane perpendicular to the carrier stream, the masking stream) is less than a cross-sectional area of the dispensing port in the horizontal plane (e.g., the cross-sectional area of the air-mask port is 50%, 35% 25%, 15%, or 10% of the cross sectional area of the dispensing port in the horizontal plane).

FIG. 1 depicts a perspective view of a nozzle 100 having an air-mask port 202 and a dispensing port 102, in accordance with aspects hereof. While an internal-mixing cap is generally depicted, it is contemplated that an external-mixing cap may also be used in connection with concepts provided herein. The nozzle 100 may be affixed to a spraying device, such as an adhesive spraying gun. The spraying device may have one or more controls, such as valves, that control the flow of gas, such as a pressurized gas like pressurized air, from one or more ports. For example, a first valve may be effective to control a volume, pressure, and/or velocity of gas expelled from the optional air-mask port 202. Similarly, a control, such as a valve, may control a volume, pressure, and/or velocity of spray material and/or pressurized fluid from the dispensing port 102. The controls of the dispensing port 102 and the air-mask port 202 may be operated in cooperation or independently. For example, in some applications of spray material, the masking stream (i.e., expelled gas from the air-mask port 202) may be on and it may be off depending on a location of the nozzle 100 relative to the substrate. Stated differently, in some aspects it is contemplated that the controls controlling the masking stream may allow for the masking stream to form a mask in some locations (e.g., along a perimeter or biteline on an article of footwear component) while not forming a mask in other location (e.g., an internal portion intended to achieve for spray material coverage).

While FIG. 1 depicts a single nozzle having both of the dispensing port and the air-mask port for illustration purposes, it is contemplated that the air-mask port and the dispensing port may be in different nozzles that are physically joined or physically independent of each other, such as that depicted in FIGS. 16-20, hereinafter. Therefore, while aspects herein illustrate a single nozzle, it is contemplated that features and limitations discussed in connection with the single nozzle may equally apply and be contemplated with a multi-nozzle approach. Similarly, features and limitations discussed in connection with a multi-nozzle implementation may equally apply and be contemplated with a single-nozzle approach.

In the example of FIG. 1 it is contemplated that the nozzle 100 may be posited proximate a substrate (e.g., 5 millimeters to 1 meter) at a first location in a tool path. A control is activated to allow a dispensing of material from the dispensing port 102 to the substrate. The material is dispensed in a spray pattern. The spray pattern is defined by the nozzle 100. The spray pattern may be selectively defined further by the use of a mask stream emanating from the air-mask port 202, as will be discussed in greater detail hereinafter. Once the material is being dispensed, such as being atomized by a stream of gas, the nozzle 100 is moved, such as by a multi-axis robotic arm. The movement of the nozzle is controlled, in an exemplary aspect, by a computing device having a processor and memory that converts one or more computer-readable instructions into a motion path. The computer-readable instructions define a tool path for moving the nozzle in at least two dimensions if not in three dimensions.

During the application of material from the dispensing port 102, the nozzle 100 may selectively activate a discharge of a masking stream from the air-mask port 202. The air-mask port 202 is configured to provide a stream of fluid, such as a gas stream, in a defined pattern, such as a laminar flow that provides a known barrier stream that is effective to prevent or reduce the outward dissemination of the spraying material. For example, as the nozzle 100 is moved along the tool path at a spray material application line (e.g., a line beyond which the spray material is not intended to be applied to the substrate), the air-mask port emits the masking stream to prevent the spray material from being applied across the application line. Stated differently, the masking stream modifies the spray pattern at the substrate surface to selectively apply the spray material to the substrate based on a relative location of the air-mask port, the dispensing port, and the application line. This relative position will be discussed in FIG. 7 hereinafter.

Figure 2:
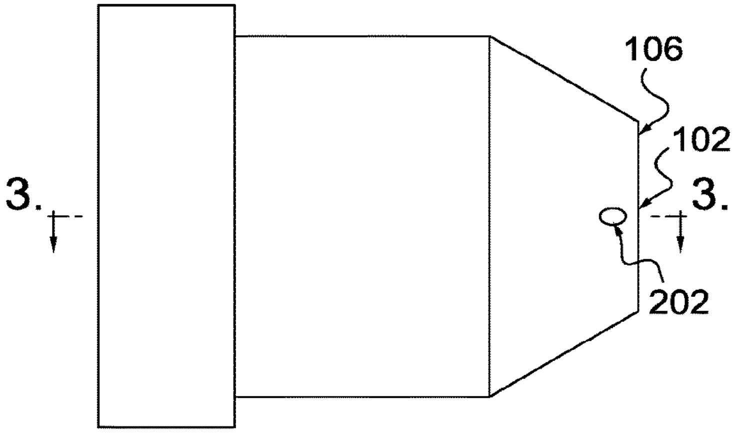
FIG. 2 depicts a side view of the nozzle from FIG. 1, in accordance with aspects hereof.
Figure 3:
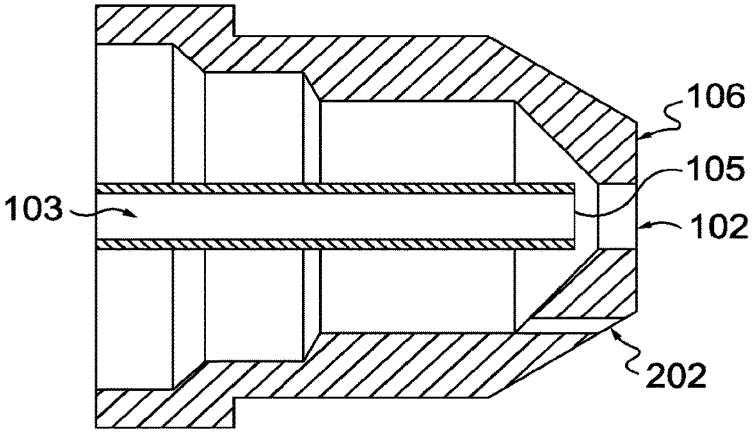
FIG. 3 depicts a cross section view of the nozzle from FIG. 2 along cutline 3-3, in accordance with aspects hereof.

FIG. 2 depicts a side profile of the nozzle 100 of FIG. 1, in accordance with aspects hereof. A distal surface 106 of the nozzle 100 is depicted. The distal surface 106 is a surface from which the spray material is emitted though the dispensing port 102. FIG. 3 depicts a cross-sectional view along a cutline 3-3 of FIG. 2, in accordance with aspects hereof.

As depicted, in FIG. 3, it is contemplated that the nozzle 100 uses a common fluid stream to both propel the spray material out of the dispensing port 102 and to generate the masking stream from the air-mask port 202. However, as provided above, the air-mask port may instead be an independently controlled stream having a different fluid or fluid source than the carrier stream.

While FIG. 3 has been simplified with respect to internal ports, channels, and the like, a portion of a delivery mechanism 103 for the spray material to a carrier stream is depicted (e.g., a fluid connector, a valve, a dispensing nozzle, a pressure/pump source, a material source). The delivery mechanism may be a conduit through which the material (e.g., adhesive, primer, colorant) is delivered to a distal end 105 proximate (e.g., with 5 mm) the dispensing port 102. Gas (e.g., air) that is flowing internal to the nozzle and supplied to both (or individually) the air-mask port 202 and/or the dispensing port 102 may then propel the material from the distal end 105 of the delivery mechanism 103 for dispensing towards the substrate.

Figure 4:
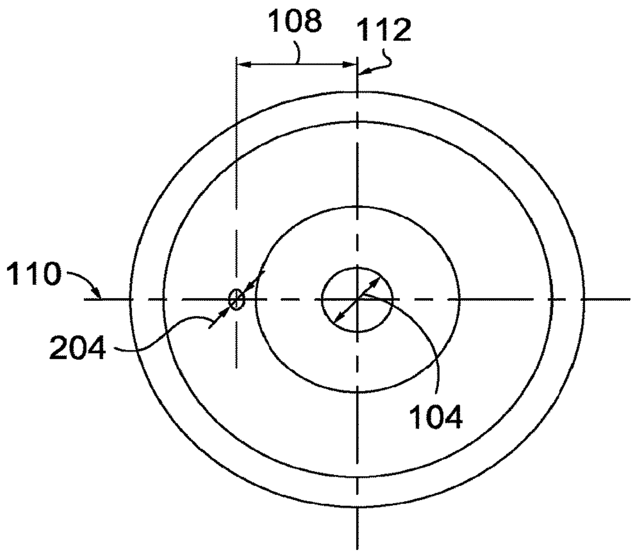
FIG. 4 depicts a bottom plan view of the nozzle from FIG. 1, in accordance with aspects hereof.

FIG. 4 depicts a distal surface plan view of the nozzle 100, in accordance with aspects hereof. A dispensing diameter 104 of the dispensing port is depicted. A masking diameter 204 of the air-masking port is depicted. An alignment axis 110 is depicted extending between the air-mask port and the dispensing port. A cross axis 112 is depicted extending through the dispensing port and perpendicular to the alignment axis 110.

In an exemplary aspect, the masking diameter 204 is less than the dispensing diameter 104. For example, the masking diameter may be in a range of 1.5 millimeters (mm) to 0.25 mm and the dispensing diameter 104 may be in a range of 3.5 mm to 1.5 mm. It is contemplated that a cross-sectional area of the air-mask port is less than a cross-section area of the dispensing port in a plane parallel to the distal surface 106. For example, the air-mask port may have a cross-section area of 0.2 square mm and the dispensing port has a cross-section area of 3.8 square mm. In other examples, the cross sectional area of the air-mask port may be at least half that of the dispensing port.

Further, it is contemplated that the air-mask port is offset to the periphery from the dispensing port by a distance 108. The distance 108 may be any distance, such as 1.5 mm, 2 mm, 3 mm, 4 mm, 5 mm, 6 mm, or 7 mm. The distance 108 may be at least 125% the dispensing diameter 104 in an exemplary aspect to achieve an effective air-mask configuration.

Figure 5:
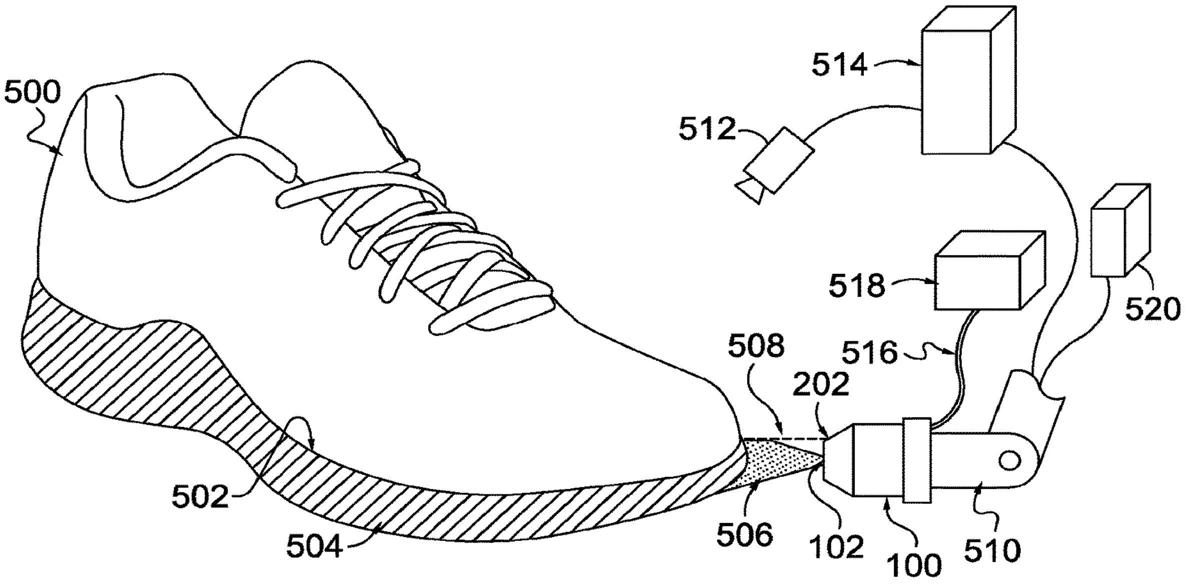
FIG. 5 depicts an exemplary system utilizing the nozzle of FIG. 1, in accordance with aspects hereof.

FIG. 5 depicts a system for implementing the nozzle 100, in accordance with aspects hereof. The nozzle 100 is coupled with a robotic arm 510. The robotic arm 510 is a multi-axis movement mechanism able to position and move the nozzle 100 in accordance to one or more instructions from a computing device 514. The computing device 514 is logically coupled with the robotic arm 510 to control movement of the robotic arm 510 and the attached nozzle 100. A vision system 512 is also logically coupled with the computing device 514. It is understood that a separate computing device may be logically coupled to one or more of the components depicted or contemplated with respect to the system of FIG. 5. A fluid source 518 is also depicted being fluidly coupled 516 with the nozzle 101. The fluid source 518 provides the fluid, such as air, to the air-mask port 202 forming a mask stream 508. A material source 520 is fluidly coupled with the nozzle 100 to provide the material for application, such as an adhesive, primer, paint, or dye as a material stream 506. As depicted in FIG. 5, the material stream 506 has a spray pattern that is affected by the mask stream 508.

An exemplary substrate is depicted as a component for an article of footwear 500, such as a shoe upper. Other substrates are contemplated, such a knit, woven, braided, non-woven textiles. The substrate may be planar or non-planar (e.g., dimensional article). For example the substrate may be a material to be formed into a garment (e.g., shirt, shorts, pants, jackets, hat, socks and the like) or it may be the garment itself. In the example of FIG. 5, the material stream 506 is applied to the article of footwear 500 to form a covered area 504. The covered area 504 has been coated with material from the material source 520 as applied from the nozzle 100. The material is, however, prevented or substantially prevented from being applied to the substrate beyond an application line 502. In this example, the application line 502 is a biteline. A biteline is a junction between a shoe upper and a shoe sole. Traditionally adhesive is applied in the covered area 504 up to the application line 502 by hand. If adhesive extends beyond the application line 502 the adhesive may be visible on the shoe upper and create a non-conforming aesthetic shoe. If the adhesive fails to substantially reach the application line 502, the sole may be more prone to becoming un-adhered to the article of footwear 500. Therefore, an ability to apply material up to the application line 502 without substantially over applying the material beyond the application line 502 allows for efficient production of an article.

In use, it is contemplated that one or more tool paths are stored in the computing device 514. The vision system 512 is effective, in a first example, to identify the article of footwear 500 by capturing an image of the substrate and comparing the image to a database of stored articles. In response to identifying the article of footwear 500, the associated tool path is determined. A determination of the tool path may include retrieving a stored tool path in the computer-readable memory for the identified article. Alternatively, the computing device 514 is effective to generate a tool path based on information captured by the vision system 512. Regardless, information captured by the vision system may be effective to determine a location on the substrate for positioning the tool path. Alternatively, one or more manufacturing jigs (e.g., registration apertures, tooling registrations) may be used to mechanically identity a location from which the tool path should originate on the substrate. Further yet, it is contemplated that other identification systems are implemented (e.g., barcode, RFID, user entry, and the like) to determine the article of footwear 500 for generation or retrieval of an appropriate tool path. The vision system 512 may also or alternatively be used to monitor material application to adjust one or more parameters of the system. For example, material dispensing from the dispensing port 102 and/or fluid expelling from the air-mask port 202 may be adjusted based on information captured by the vision system 512 during an applying stage.

The fluid source 518 may be a tank, pump, generator, or other source of pressure. The fluid source 518 may be a compressor that pressurizes atmospheric air. The fluid source 518 may be a tank of non-atmospheric gas (e.g., $N2$, $O2$, and $CO2$) that has been pressurized.

The material source 520 may be a tank having the material contained therein. The material source may also be a mechanical element, such as a pump, to feed the material to the nozzle 100. The material source may maintain a liquid or solid material. For example, the material may be a powder coating to be applied. The material may be a liquid composition to be applied.

In combination, the components of FIG. 5 may be used to apply a material to a substrate in a manner that prevents application of the material beyond the application line through use of an air-mask port emitting a mask stream. One or more of the components depicted in FIG. 5 may be omitted or adjusted in size, shape, and/or quantity (e.g., multiple computing devices 514 are contemplated). Additional components are contemplated within the scope of FIG. 5. For example, one or more material conveyance mechanisms to move or otherwise position the substrate(s) are contemplated.

While a single nozzle is depicted in FIG. 5 for illustration purposes, it is contemplated that two (or more) nozzles may be implemented in actuality with the other components depicted. For example, a first nozzle having a dispensing port may be joined with a second nozzle having an air-mark port, such that a common conveyance mechanism (e.g., a robot, and X-Y plane table), may move both the first and the second nozzle in unison. Alternatively, it is contemplated that a first nozzle having a dispensing port and a second nozzle having an air-mask port may be moved independent of each other by discrete movement mechanisms. Further yet, it is contemplated that a first nozzle and a second nozzle may be moved on a macro scale by a common movement mechanism (e.g., a multi-axis robot), while each nozzle may be moved independently by another movement mechanism positioned between the macro-movement mechanism and each nozzle (e.g., an pivoting adjuster, such as a pneumatic cylinder for adjusting a relative angle between the first and second nozzles). In examples having more than nozzle, it is contemplated that independent and discrete systems discussed in connection with FIG. 5 may be implemented for each nozzle. Alternatively, it is contemplated that one or more of the systems/components discussed in connection with FIG. 5 may service both of the first and second nozzle, in an exemplary aspect.

Figure 6:
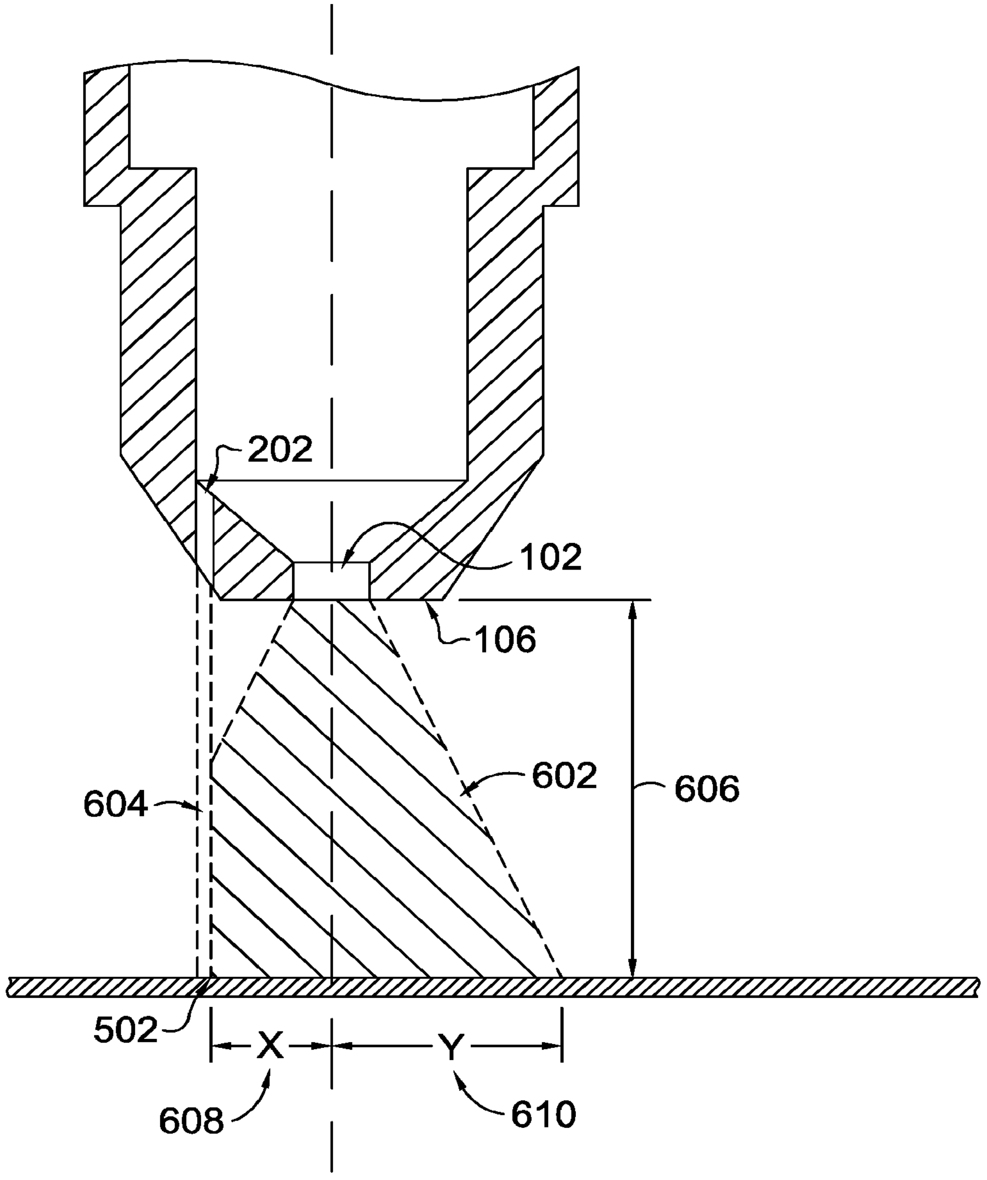
FIG. 6 depicts a cross section of a nozzle having an air-mask port activated, in accordance with aspects hereof.

FIG. 6 depicts a cross sectional view of material application as modified by a mask stream 604, in accordance with aspects hereof. Material is dispensed from the dispensing port 102 as a material stream 602 towards a substrate. The mask stream 604 is expelled from the air-mask port 202. The mask stream 604 interferes with the defined spray pattern of the material stream 602 at the application line 502 on the substrate. As such, the material from the material stream 602 does not extend (or at least does not substantially extend) beyond the application line 502. This deformation of the spray pattern is demonstrated by a distance y 610 that is greater than a distance x 608. The distance x 608 is from a dispensing axis to the application line 502 along the alignment axis that extends between the air-mask port and the dispensing port. The distance y 610 is from the dispensing axis to the spray pattern intersection with the substrate along the alignment axis that extends between the air-mask port and the dispensing port. If the mask stream 604 was to be omitted, distance x 608 and distance y 610 may be equal. However, because of the mask stream 604, the material is applied up to the application line 502, which is less than the emitted spray pattern coverage.

As provided herein, an "axis" (i.e., masking axis, dispensing axis, alignment axis) is a line that extends from a first point to a second point, but the line is not physically present. It is a reference line for measurement and positioning. For example, because a gas stream emanating from a port may change shape as it extends from the port, a common reference is a single line that represents a parallel path of the fluid (e.g., air stream) as it emits from the port. Generally this axis emanates from a central location of the port and is oriented parallel to an average material stream orientation from the port as it emanates. In a traditional port, the axis extends parallel to sidewalls by which the fluid passes defining the port.

The nozzle is maintained a distance 606 from the substrate. The distance 606 may be any distance, such as 5 mm to 1 meter. As can be appreciated from the FIG. 6, a parallel relationship is formed between the mask stream 604 and a spray line extending through the dispensing port 102. As the distance 606 increases, the outward projecting material stream 602 increases the distance y 610. However, because of the parallel relationship of the mask stream 604, the distance x 608 remains substantially constant with a changing distance 606. This is a distinction from traditional spray pattern modifiers (e.g., an air horn) that modify the spray pattern proximate to the material dispensing port (e.g., the modifying stream is angled into the spray line as opposed to parallel with the spray line). In the illustrated example, as the distance increases or changes, such as by applying material to a three-dimensional article having different curves and angles, less control over the distance 606 may be used to ensure application of the material to the application line 502; because the mask stream 604 ensures the spray pattern terminates at the application line 502. As such, a distance maintained between the nozzle and the substrate may have a more relaxed tolerance when using the air-mask port 202 instead of when not using the air-mask port 202, in an exemplary aspect.

While FIG. 6 (and FIGS. 12, 13, 19, and 20) depicts a parallel relationship between the mask stream and the spray line, it is contemplated that a non-parallel relationship between the mask stream (e.g., masking axis) and the spray line (e.g., dispensing axis) is used to create and intersection between the two stream proximate the substrate (e.g., within 10 cm, within 5 cm, within 1 cm), as will be depicted in FIGS. 17 and 18 hereinafter.

Figure 7:
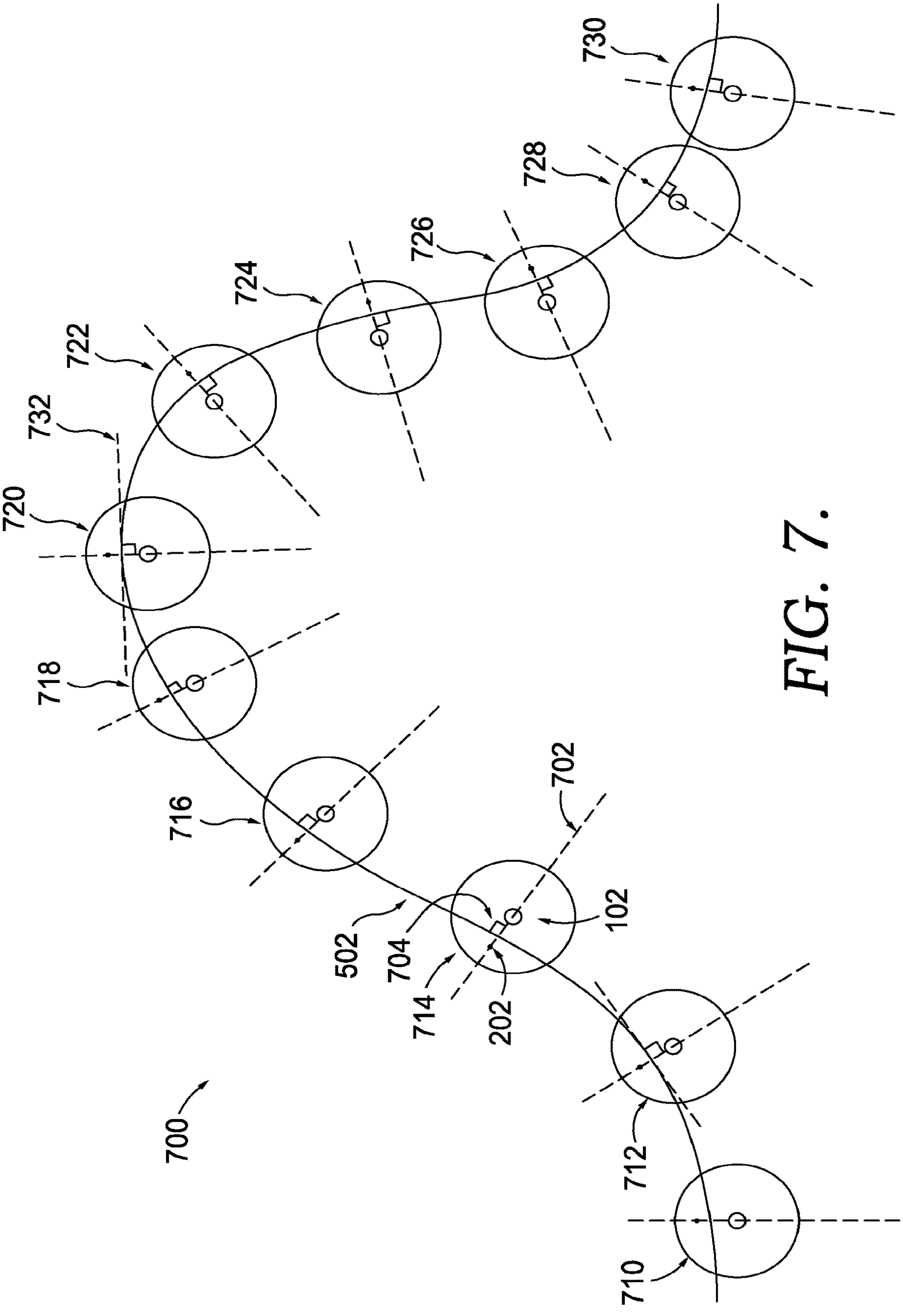
FIG. 7 depicts an exemplary sequence of a nozzle having an air-mask port moving along an application line, in accordance with aspects hereof.

FIG. 7 depicts a sequence 700 of the air nozzle 100 following a tool path along the application line 502, in accordance with aspects hereof. The nozzle is depicted as moving from a location identified as 710 to a location 730 with an in-order location listing of 712, 714, 716, 718, 720, 722, 724, 726, and 728. Stated differently, the nozzle moves along the application line 502 from the position 710 to the location 730 as depicted in FIG. 7.

In each aspect, the rotational alignment of the nozzle is maintained such that an alignment axis 702 extending between the dispensing port 102 and the air-mask port 202 (or any other air mask port or physical mask) is perpendicular 704 (or substantially perpendicular to within 15 degrees) to the application line 502. Stated differently, by maintaining the alignment axis 702 in a perpendicular relationship to the application line 502 during application of the mask stream, an effective air mask is created to prevent material application beyond the application line 502 opposite a side on which the dispensing port 102 is positioned. In an exemplary aspect the air-mask port 202 or any other port used to define the alignment axis is on a first side of the application line 502 and the dispensing port 102 is on a second side of the application line 502. In yet another aspect, both the air-mask port 202 and the dispensing port 102 are on a first side of the application line 502. In yet another aspect, the air-mask port 202 is positioned on the application line 502. Further, an alignment axis is contemplated to also extend between an air-mask port and a dispensing port even when a first nozzle has the dispensing port and a second nozzle has the air-mask port. Stated differently, an alignment axis is present regardless of if a single or a multi-nozzle approach is implemented.

By maintaining a substantially perpendicular relationship between the alignment axis 702 and the application line 502, the mask stream is effective to reduce or prevent material application beyond the application line. For example, it is contemplated that the mask stream is laminar in flow and therefore provides a consistent mask to the material. A consistent mask allows for a predictable obstruction to the spray pattern of the material to effectively dispense the material in predicted locations of the substrate, in an exemplary aspect. In yet other aspects, having an orientation of the alignment line to the application line outside of a defined range (e.g., 75 degrees to 105 degrees) causes the air mask to interfere with application of material along the application line instead of aiding in the application of material along the application line.

Figure 22:
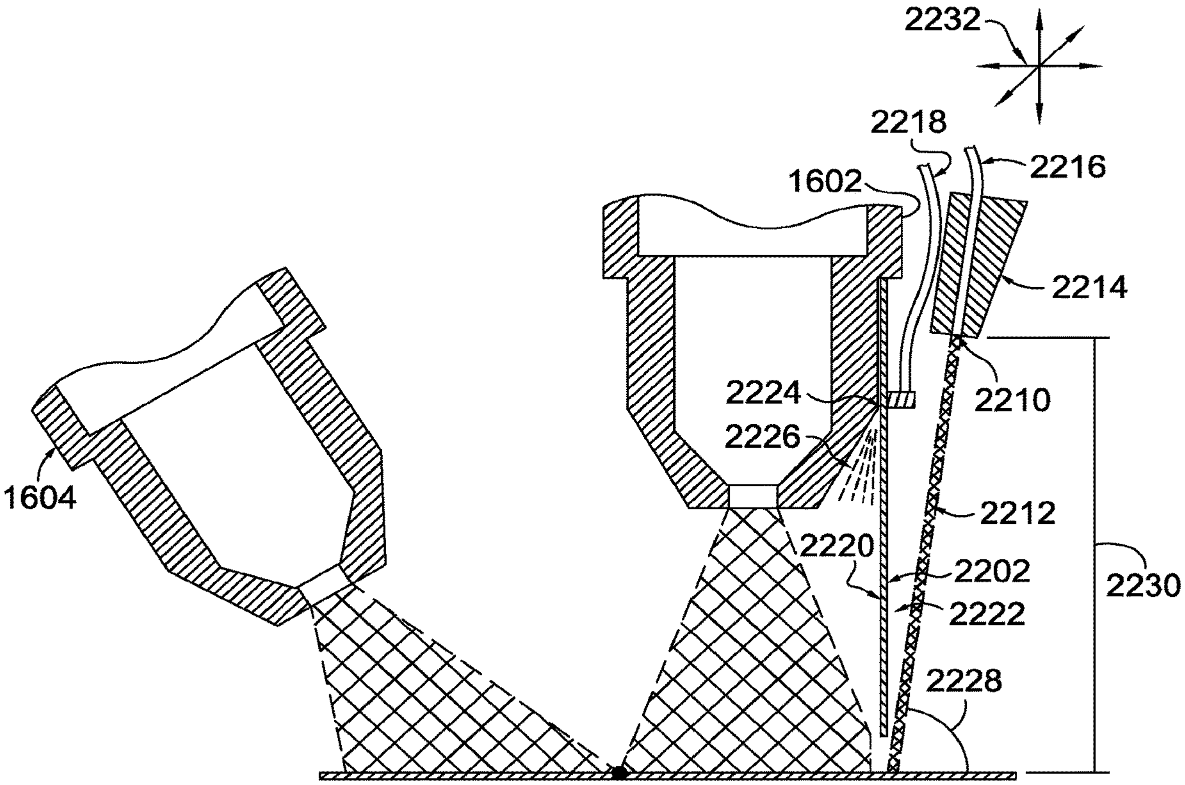
FIG. 22 depicts versions of the first nozzle and the second nozzle of FIG. 16 with the first nozzle having an optional physical mask extension and an optionally third nozzle, in accordance with aspects hereof.

The alignment axis 702, while based on the dispensing port 102 and the air-mask port 202 in FIG. 7, it is contemplated that the alignment axis 702 may alternatively be based on a dispensing port and any air-mask port, such as an air-mask port of a second nozzle and/or a third nozzle (e.g., the air-mask port 2210 of FIG. 22). Stated alternatively, the alignment axis may extend through a dispensing port and an air-mask port, such as the air-mask port 2210 of FIG. 22. Therefore, while the discussion of FIG. 7 is generally directed to the specific air-mask port 202 of FIG. 7, the disclosure is intended to and contemplated to equally apply to an alignment axis extending between a dispensing port and a mask, such as an air-mask port (e.g., the air-mask port 202 of FIG. 7, the air-mask port 2210 of FIG. 22) or a physical mask (e.g., the physical mask 1914 of FIG. 19, the physical mask 2202 of FIG. 22). As such, this disclosure represents maintaining a perpendicular relationship (or any defined angular relationship) between an application line and an alignment axis.

Further yet, it is contemplated that the alignment axis 702 may be based on a dispensing port and a physical mask. Stated differently, an alignment axis that is maintained perpendicular to an application line may be determined as extending through a dispensing port and a mask (e.g., a physical mask and/or air mask). For reasons discussed in connection with FIG. 7, the perpendicular relationship between the alignment axis and an application line allows for controlled application of material along the application line.

Figure 8:
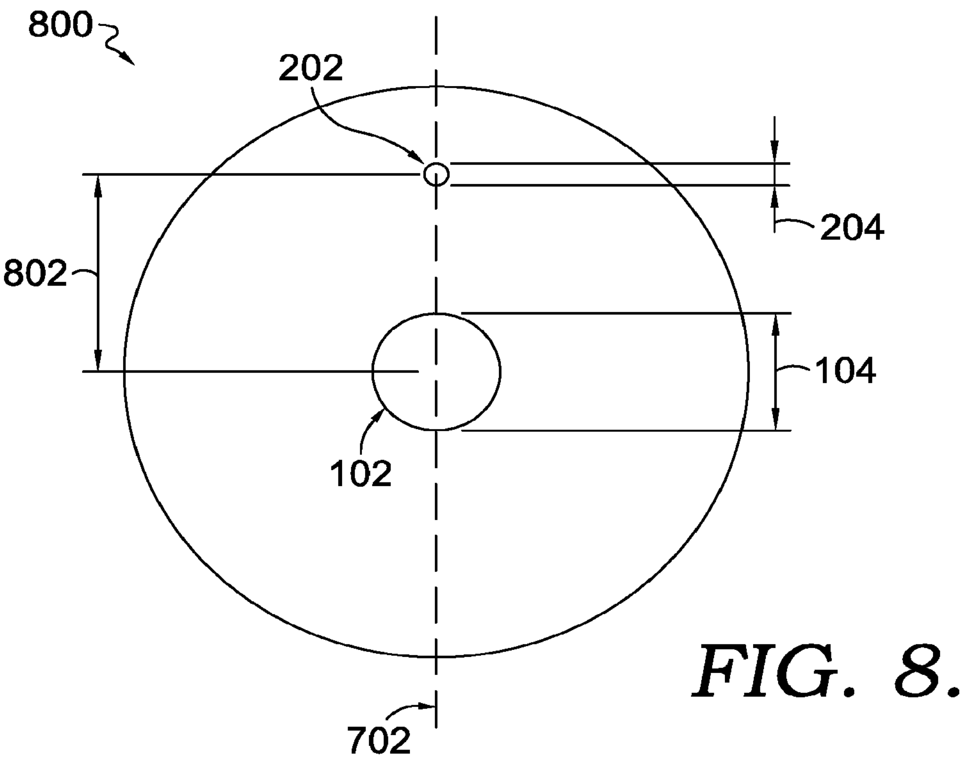
FIGS. 8-11 depict alternative air-mask port configurations, in accordance with aspects hereof.

FIGS. 8-11 depict alternative air-mask port configurations, in accordance with aspects hereof. FIG. 8 depicts a configuration 800 similar to that previously discussed in FIGS. 1-4. The air-mask port 202 and the dispensing port 102 are both circular in the horizontal cross section. The air-mask port 202 has a diameter of 204 that is less than a diameter 104 of the dispensing port 102. Furthermore, the air-mask port 202 is peripherally offset from the dispensing port 102 by a distance 802. In an exemplary aspect, the distance 802 is greater than the diameter 104, and the diameter 104 is greater than the diameter 204. This relative sizing of the various elements and position allows for an effective masking of material dispensed from the dispensing port 102, in an exemplary aspect.

Figure 9:
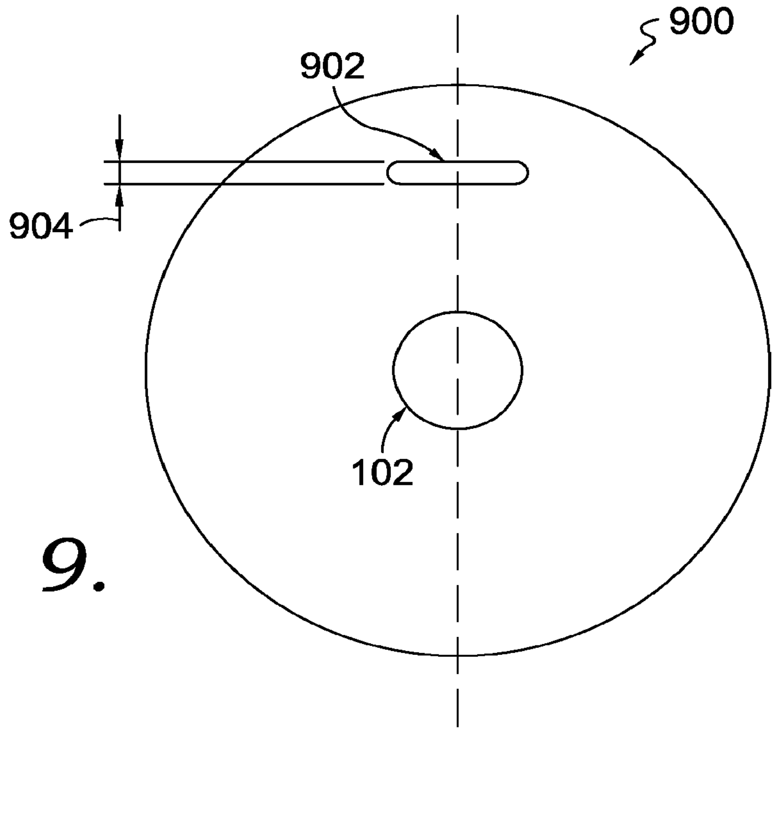

FIG. 9 depicts a configuration 900 of an air-mask port 902 having an elliptical cross section in the horizontal plane, in accordance with aspects hereof. The air-mask port 902 has a major axis perpendicular to the alignment axis and a minor axis parallel with the alignment axis. The air-mask port 902 has a width measured along the alignment axis of distance 904. The distance 904 is less than a diameter of the dispensing port 102. The air-mask port 902 may be effective to generate a linear mask stream, in an exemplary aspect.

Figure 10:
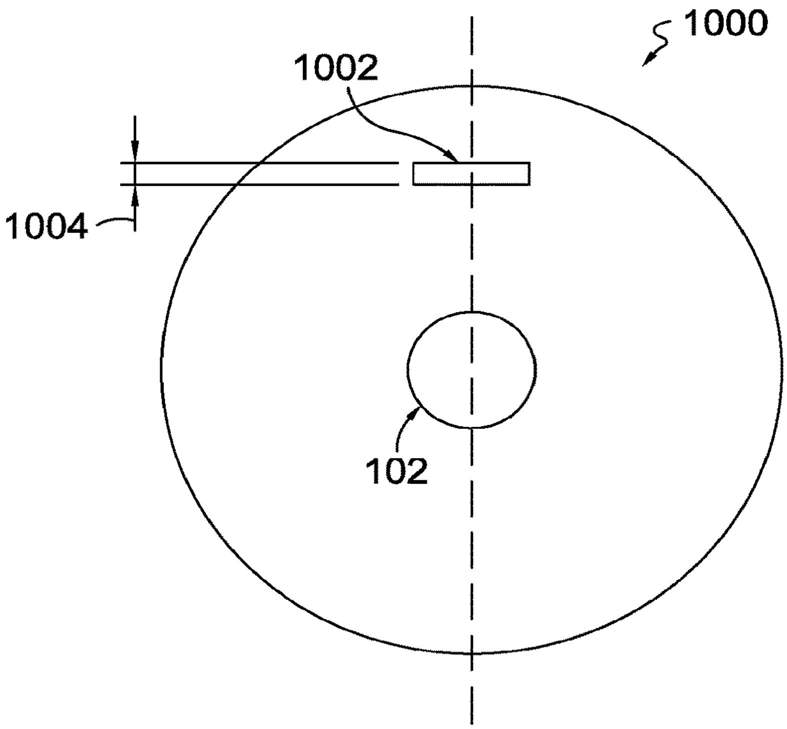

FIG. 10 depicts a configuration 1000 of an air-mask port 1002 having a rectilinear cross section in the horizontal plane, in accordance with aspects hereof. The air-mask port 1002 has a major axis perpendicular to the alignment axis and a minor axis parallel with the alignment axis. The air-mask port 1002 has a width measured along the alignment axis of distance 1004. The distance 1004 is less than a diameter of the dispensing port 102. The air-mask port 1002 may be effective to generate a linear mask stream, in an exemplary aspect.

Figure 11:
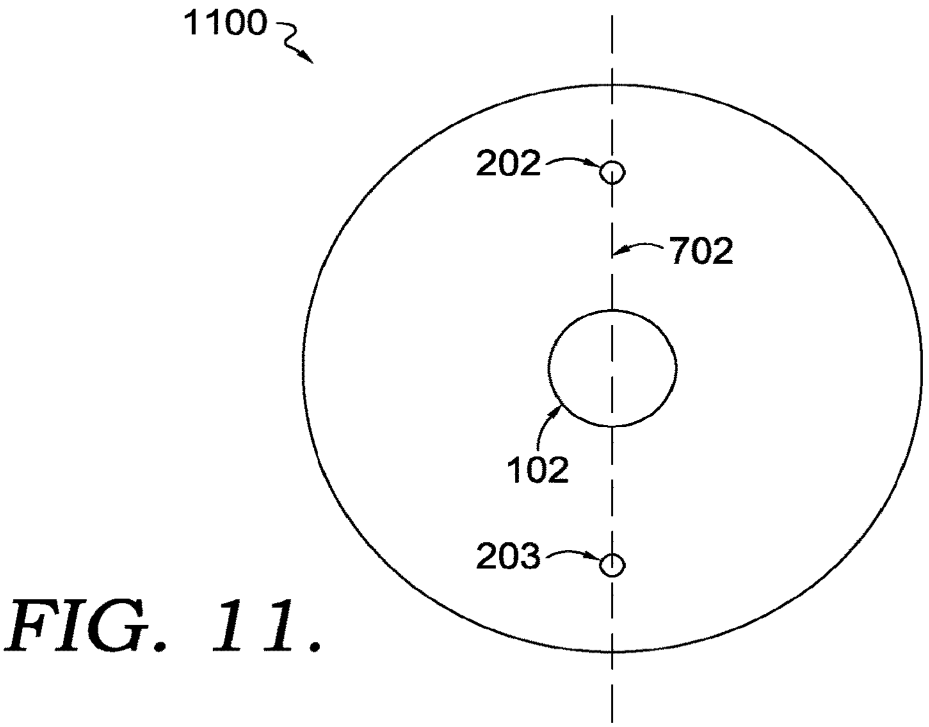

FIG. 11 depicts a configuration 1100 of dual air-mask ports 202 and 203, in accordance with aspects hereof. The dual air-mask ports 202 and 203 are aligned on the alignment axis 702 with each on a different side of the dispensing port 102. In this example, control at the substrate surface may be achieved for the material application. Therefore, if material is intended to be applied in a strip on the substrate defined between the dual air-mask ports 202 and 203, both air-mask ports may simultaneously expel a mask stream. Alternative, the air-mask port 202 may be used exclusive of the air-mask port 203. Instead of rotating the nozzle 180 degrees, a different air-mask port may emit a mask stream. Stated differently, it is contemplated that a nozzle may have two or more air-mask ports that are independently activated to produce air mask streams relative to the portion of the nozzle on the substrate while reducing movement of the nozzle to achieve a given mask stream at a given orientation.

Additionally, it is contemplated that two or more air-mask ports may be independently controllable on a nozzle (or multiple nozzles) with the air-mask ports having different size, shape, and/or orientation. Therefore, instead of changing out a nozzle for a different spray material or application line; a different independently controlled air-mask port may be activated to generate a varied or alternative mask stream.

Figure 12:
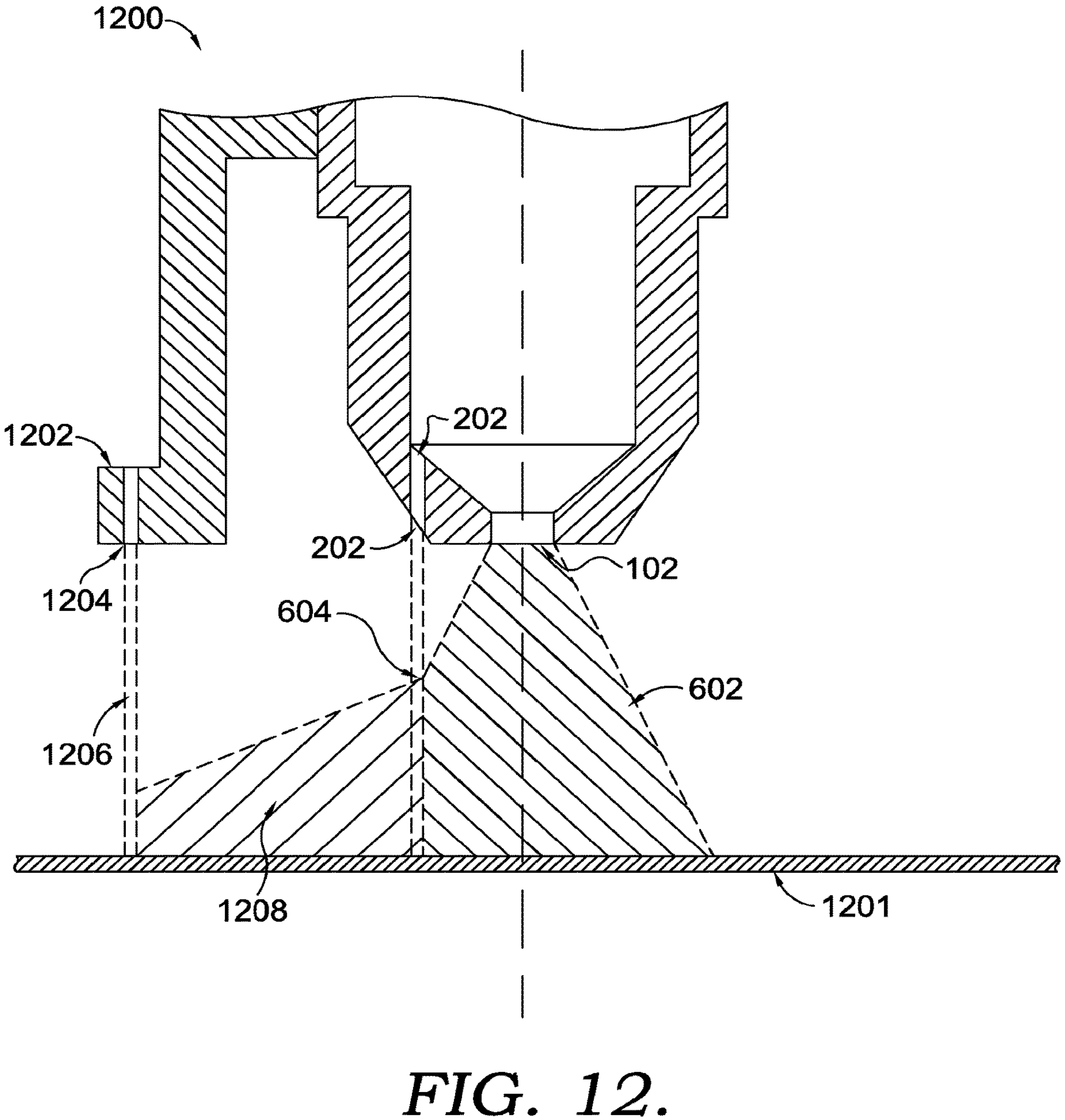
FIG. 12 depicts a nozzle having an active air-mask port and a supplemental gas knife on a common side of the dispensing port, in accordance with aspects hereof.
Figure 13:
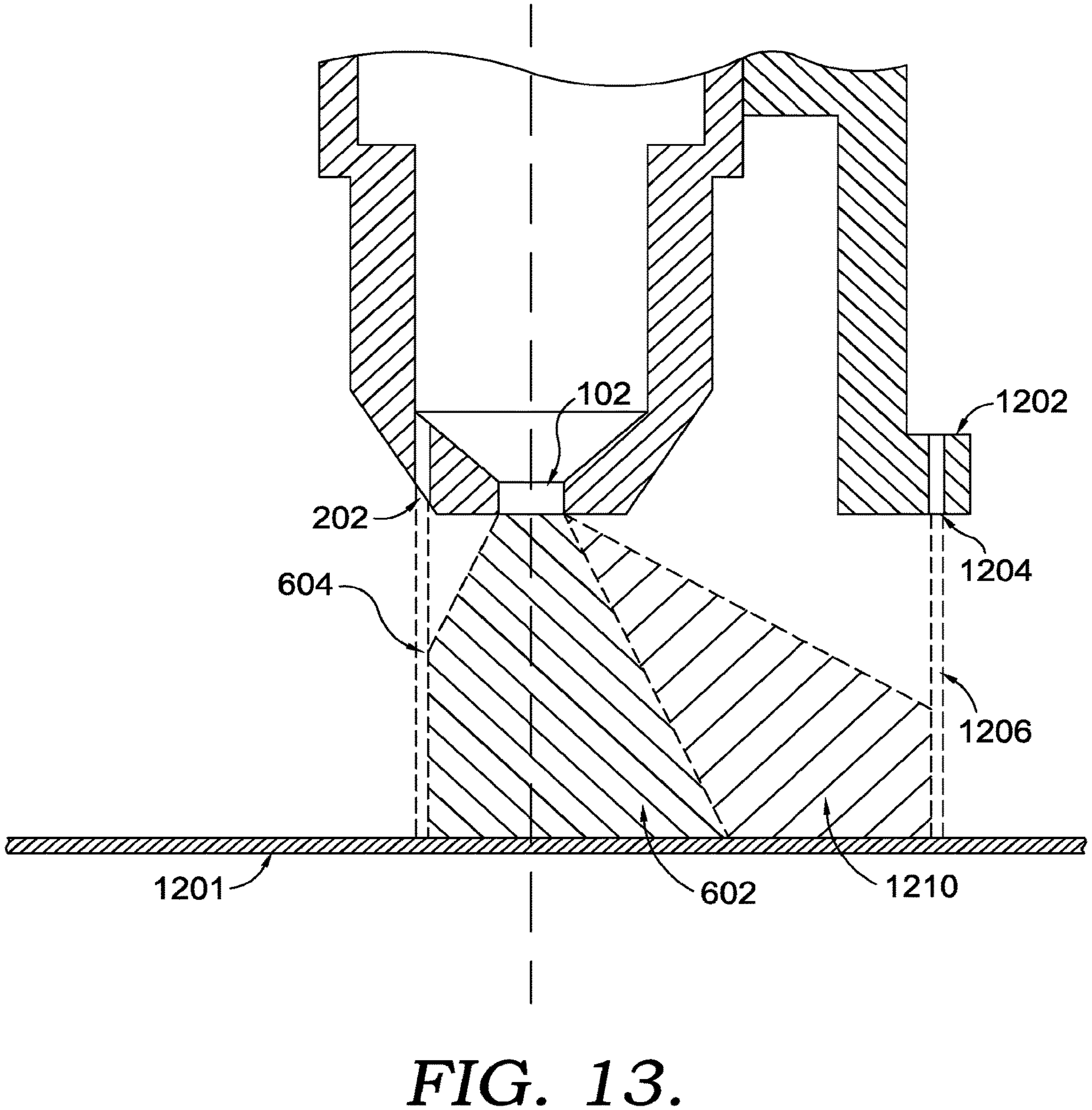
FIG. 13 depicts a nozzle having an active air-mask port and a supplemental gas knife on opposite sides of the dispensing port, in accordance with aspects hereof.

FIGS. 12 and 13 depict additional aspects of the nozzle having a gas knife 1202, in accordance with aspects hereof. FIG. 12 depicts the gas knife 1202 positioned along the alignment axis on a same side of the dispensing port 102 as the air-mask port 202. In this example, the gas knife 1202 can serve as a supplemental barrier to over spraying of the material to a substrate 1201. For example, the primary spray stream is depicted as 602. The mask stream 604 is depicted as forming a mask of the material. However, in some aspect the material may extend through the mask stream 604 as overspray 1208. In this situation, the gas knife 1202 has an exit port 1204 that expels gas, such as pressurized air, to form a secondary masking stream 1206. Therefore, the gas knife 1202 is effective to produce a secondary masking effect for overspray 1208 that extends through the mask stream 604. In this example, the gas knife 1202 is a secondary spray pattern adjuster having a parallel fluid stream to a spray line. Therefore, the exit port 1204 is offset a greater distance from the dispensing port 102 than the air-mask port 202 is offset from the dispensing port 102.

A gas knife is a discrete type of air mask. A gas knife is an air mask formed in a separate nozzle from the dispensing port. The nozzle having the air knife may be physically joined (e.g., integrally formed or discretely joined) and statically positioned or it may be physically separated and dynamically positioned relative to the nozzle having the dispensing port. Therefore, reference herein to an air mask and associated features (e.g., air-mask port) is inclusive of a gas knife and associated disclosure herein.

The gas knife 1202 may be independently activated and controlled from the air-mask port 202 and/or the dispensing port 102. As such, the gas knife 1202 may be activated along some portions of the tool path and not active along other portions of the tool path. The gas knife 1202 may use the same fluid or a different fluid or fluid source from the air-mask port 202. The gas knife 1202 may expel a greater volume and/or a great pressure of fluid than the air-mask port 202. In an exemplary aspect, as the gas knife 1202 is further from the application line than the air-mask port 202, this greater pressure and/or volume is acceptable as more turbulence in fluid flow is allowable further from the application line, in some aspects.

FIG. 13 depicts the gas knife 1202 positioned along the alignment axis on a different side of the dispensing port 102 as the air-mask port 202. In this example, the gas knife 1202 can serve as a barrier to over spraying 1210 of the material on the substrate 1201. For example, if the dispensing port 102 forms an obstruction, clog, or other spray-pattern-varying defect (e.g., residual material altering the shape of the dispensing port 102), the gas knife 1202 can aid in reducing the overspray 1210 from being applied beyond the gas knife 1202. It is contemplated that a combination of air knifes may be used in combination or individually.

Figure 14:
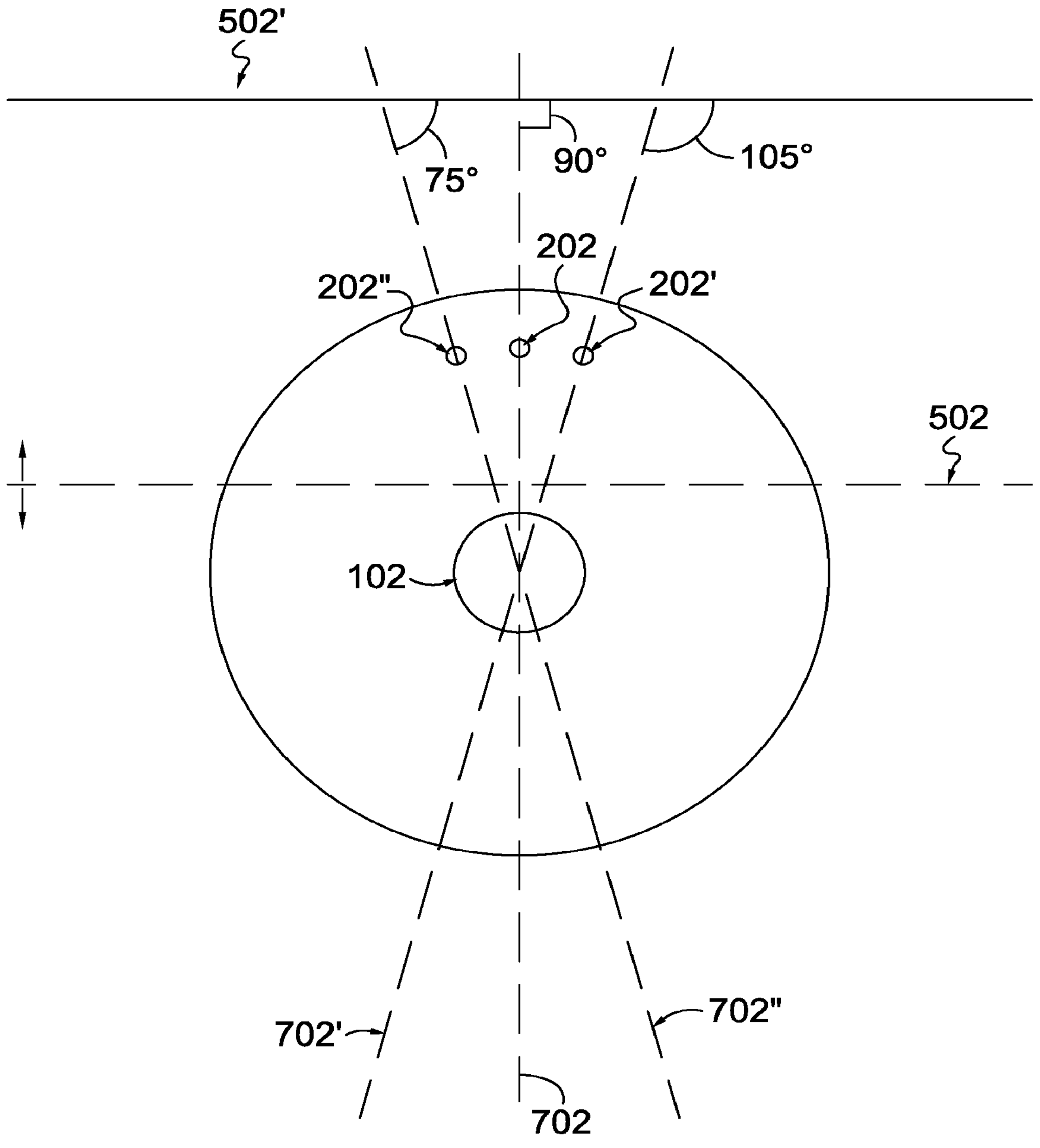
FIG. 14 depicts an exemplary method for applying a material from a nozzle having an air-mask port, in accordance with aspects hereof.

FIG. 14 depicts a range of orientations that a nozzle may be in relative to an application line 502', in accordance with aspects hereof. The alignment axis 702 extending between the air-mask port 202 and the dispensing port 102 is depicted in a perpendicular relationship with the application line 502'. However, it is contemplated that the nozzle may be oriented in some examples between 75 degrees and 105 degrees relative to the application line 502'. For example, an alignment axis 702' extends from the air-mask port in an orientation 202'. The alignment axis 702' interests the application line 502' at 105 degrees. In another example, an alignment axis 702" extends from the air-mask port in an orientation 202". The alignment axis 702" interests the application line 502' at 75 degrees. In some aspects, the relative position of the alignment axis to the application line may be within the 75 degree to 105 degree orientation to provide a sufficient mask stream to the application of material to a substrate along the application line 502'.

Figure 15:
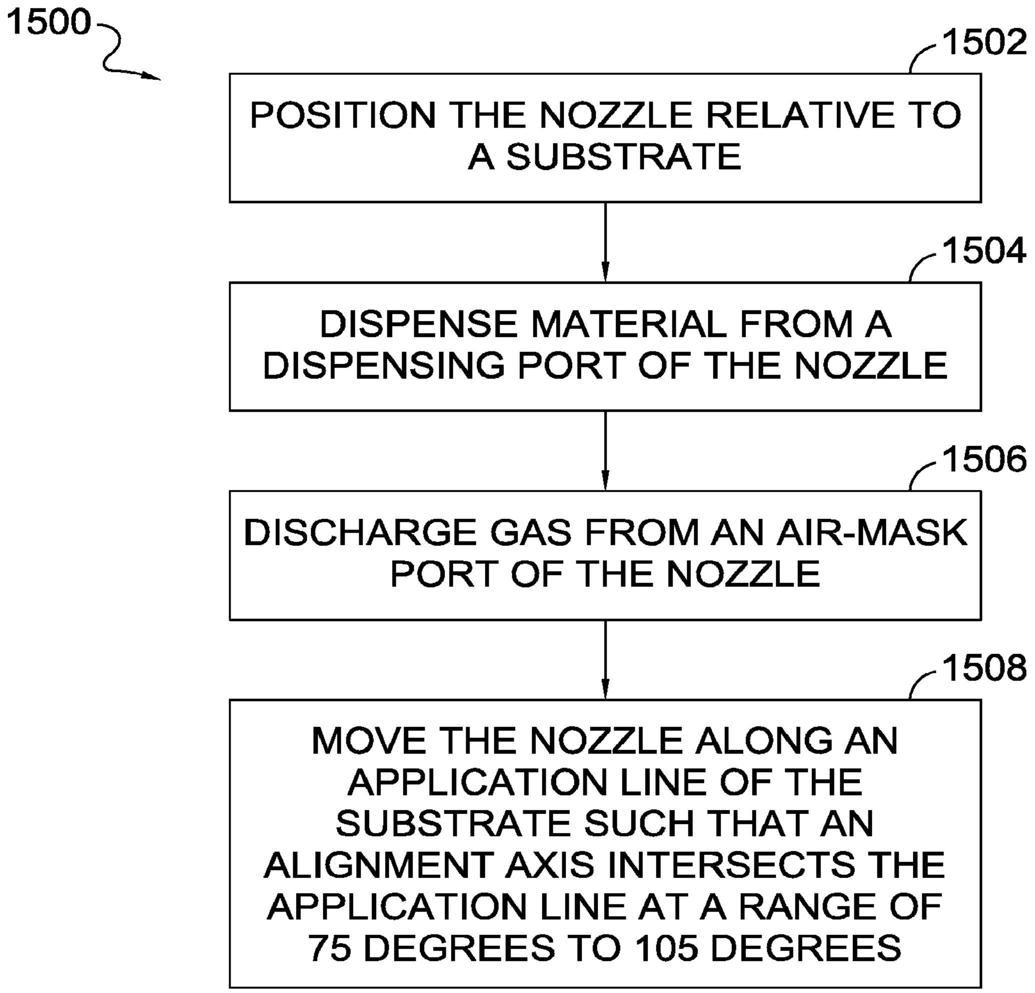
FIG. 15 depicts a method of dispensing material from a dispensing port and discharging gas from an air-mask port, in accordance with aspects hereof.

FIG. 15 illustrates a method 1500 of applying material from a nozzle having an air-mask port and a dispensing port, in accordance with aspects hereof. At a block 1502, the nozzle is positioned relative to the substrate. In an exemplary aspect, the nozzle may be posited by a movement mechanism, such as a robotic arm. The position at which the nozzle is place relative to the substrate may be defined by a tool path associated with the substrate. The tool path may be provided by and/or determined by a computing device. The computing device may use one or more components, such as a vision system having a camera, to identify the substrate and where a tool path should be positioned on the substrate. The vision system may confirm the nozzle is positioned appropriately along the tool path, in an exemplary aspect.

At a block 1504, material is dispensed from a dispensing port of the nozzle. The material may be a liquid or a solid (e.g., powder). The material may be an adhesive, primer, paint, dye, or other material to be deposited on the substrate. The material may be dispensed through a material stream of gas that atomizes and transports the material to the substrate. The material may be dispensed as a pressurized stream of liquid from the dispensing port. The dispensing may be controlled by the computing device.

At a block 1506, a gas is expelled or discharged from an air-mask port associated with the same nozzle or a different nozzle (e.g., an air knife). The gas may be a pressurized atmospheric air. The expelling of the gas may for a virtual wall that the material being dispensed cannot or has difficult breaching. Therefore, the pressurized air stream, referred to herein as a mask stream, creates a virtual masking of the substrate from the material being dispensed. The mask stream may be independently controlled from the dispensing of the material. Or, alternatively, the mask stream may be coupled to the dispensing operation such that when dispensing of material occurs so does the mask stream, in an exemplary aspect.

At a block 1508, the nozzle is moved along an application line of the substrate such that an alignment axis of the nozzle intersects the application line at an angle range of 75 degrees to 105 degrees. The movement of the nozzle while dispensing material and discharging the mask stream may be controlled by a movement mechanism (e.g., a robotic arm) in combination with a computing device. In some example, the air-mask port is on a first side of the application line and the dispensing port is on an opposite second side of the application line. In an alternative exemplary aspect, the air-mask port and the dispensing port are on a common side of the application line and the air-mask port is closer in proximity to the application line than the dispensing port.

Figure 16:
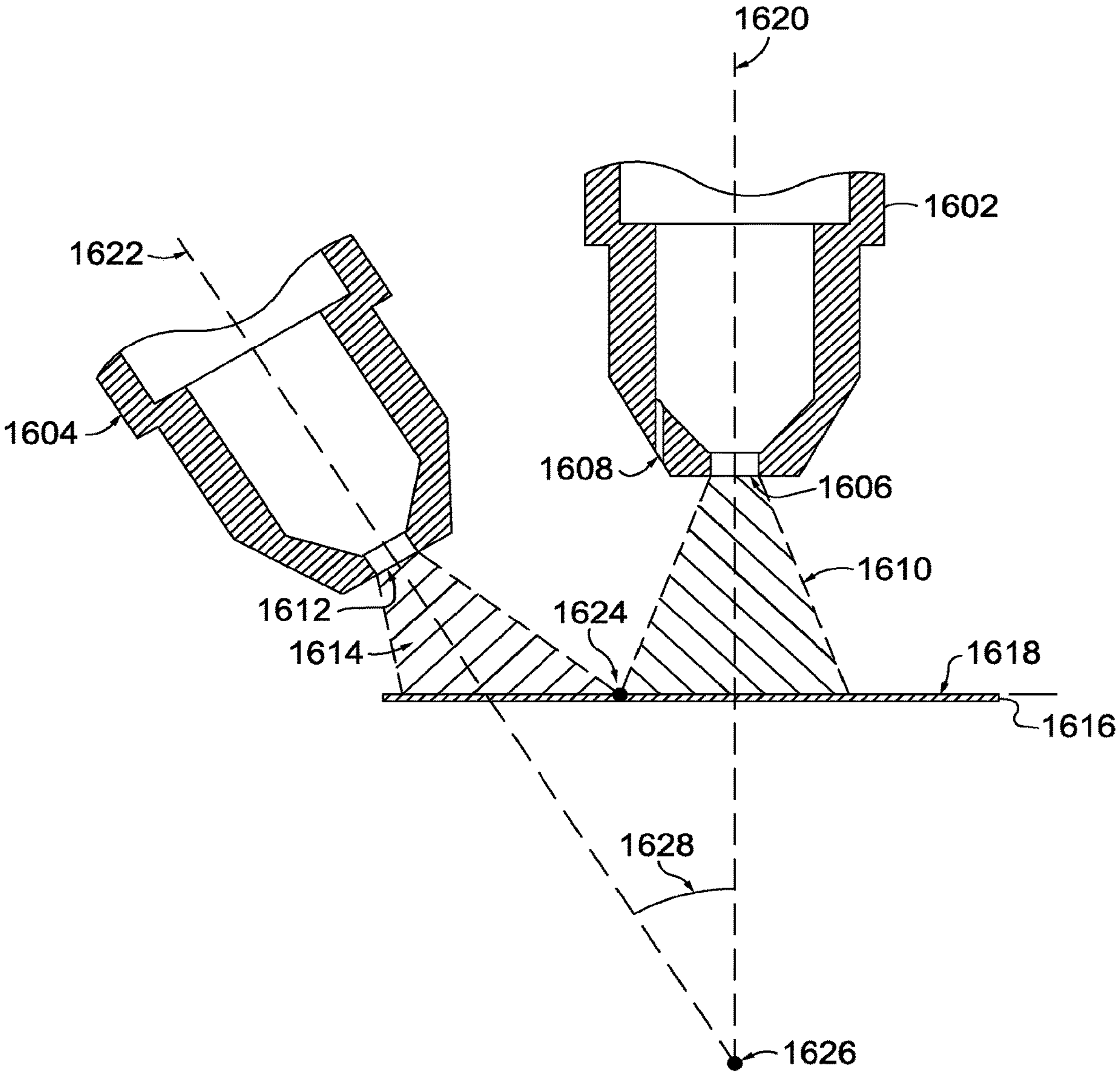
FIG. 16 depicts a first nozzle having a dispensing port and a second nozzle having an air-mask port, in accordance with aspects hereof.

FIG. 16 depicts a first nozzle 1602 having a dispensing port 1606 and a second nozzle 1604 having an air-mask port 1612, in accordance with aspects hereof. An orientation of the first nozzle 1602 and the second nozzle 1604 is such that resulting streams emanating therefore intersect proximate (e.g., 10 cm, 5 cm, 1 cm, 5 mm, 1 mm) a substrate surface 1618. The intersection of a spray stream 1610 and an air-mask stream 1614 may be identified by a material intersection 1624 and/or by an intersection 1626 of a dispensing axis 1620 and a masking axis 1622. For consistency and simplicity, an intersection between a first nozzle stream and a second nozzle stream will be in reference to the axial intersection (e.g., intersection 1626) as the various streams have characteristics that may be adjusted (e.g., size, shape).

An angle 1628 between the dispensing axis 1620 and the masking axis 1622 is set to ensure the intersection 1626 occurs within a predefined distance of the substrate surface 1618. For example the angle 1628 may be defined to ensure the intersection 1626 occurs within 10 cm, 5 cm, 1 cm, 5 mm, or 1 mm of the substrate surface 1618. The purpose of the angle 1628, in some aspects is to ensure the material applied from the first nozzle 1602 does not extend past an application line, such as an application line at the intersection 1624. While some aspects herein contemplate a parallel relationship between an masking axis and a dispensing axis to provide a virtual wall that is relatively independent of a distance of a nozzle from the substrate, having the angle 1628 may provide greater control of the material application along an application line when a distance between the one or more nozzles and the substrate surface 1618 is controlled.

As a non-planar surface to have material is contemplated (e.g., a three-dimensional shoe upper), it is contemplated that a movement mechanism may maintain a known distance between the first nozzle 1602 and the surface, the movement mechanism may adjust a position of the first nozzle 1602 relative to the application lien to compensate for a distance between the surface and the first nozzle 1602. For example, as the dispensing port 1606 gets closer to the surface, a distance in the alignment axis between the dispensing axis 1620 and the application line is reduced. Further yet, it is contemplated that the angle 1628 may be dynamically adjusted by a movement mechanism based on a distance of the dispensing port 1606 (or first nozzle 1602) from the substrate. As such, a non-parallel relationship between the masking axis 1622 and the dispensing axis 1620 may be leveraged to achieve a controlled distribution of material while compensating for variations in distance between the first nozzle 1602 and the substrate.

Additionally, it is contemplated that the first nozzle 1602 may comprise an air-mask port 1608. The air-mask port 1608 is optionally included and/or optionally utilized, as depicted in FIG. 22 hereinafter as being optionally omitted. Further, the air-mask port 1608 is depicted as being positioned between the first nozzle 1602 and the second nozzle 1604. In this depicted relative position, the air-mask port 1608 may direct a stream of fluid to further guide or shape the spray stream 1610. Alternatively, the air-mask port 1608 may be positioned opposite the second nozzle 1604 to aid in shaping or otherwise forming the spray stream 1610 on an opposite side from the second nozzle 1604. The air-mask port 1608, in an exemplary aspect, functions as described in connection with the air-mask port 202 of FIG. 1, hereinabove. The air-mask port 1608 is selectively activated to dispense a fluid, such as compressed gas, in an exemplary aspect. As such, in some modes of operation the air-mask port 1608 dispenses a fluid and in other modes of operation the air-mask port 1608 does not dispense a fluid.

Figure 17:
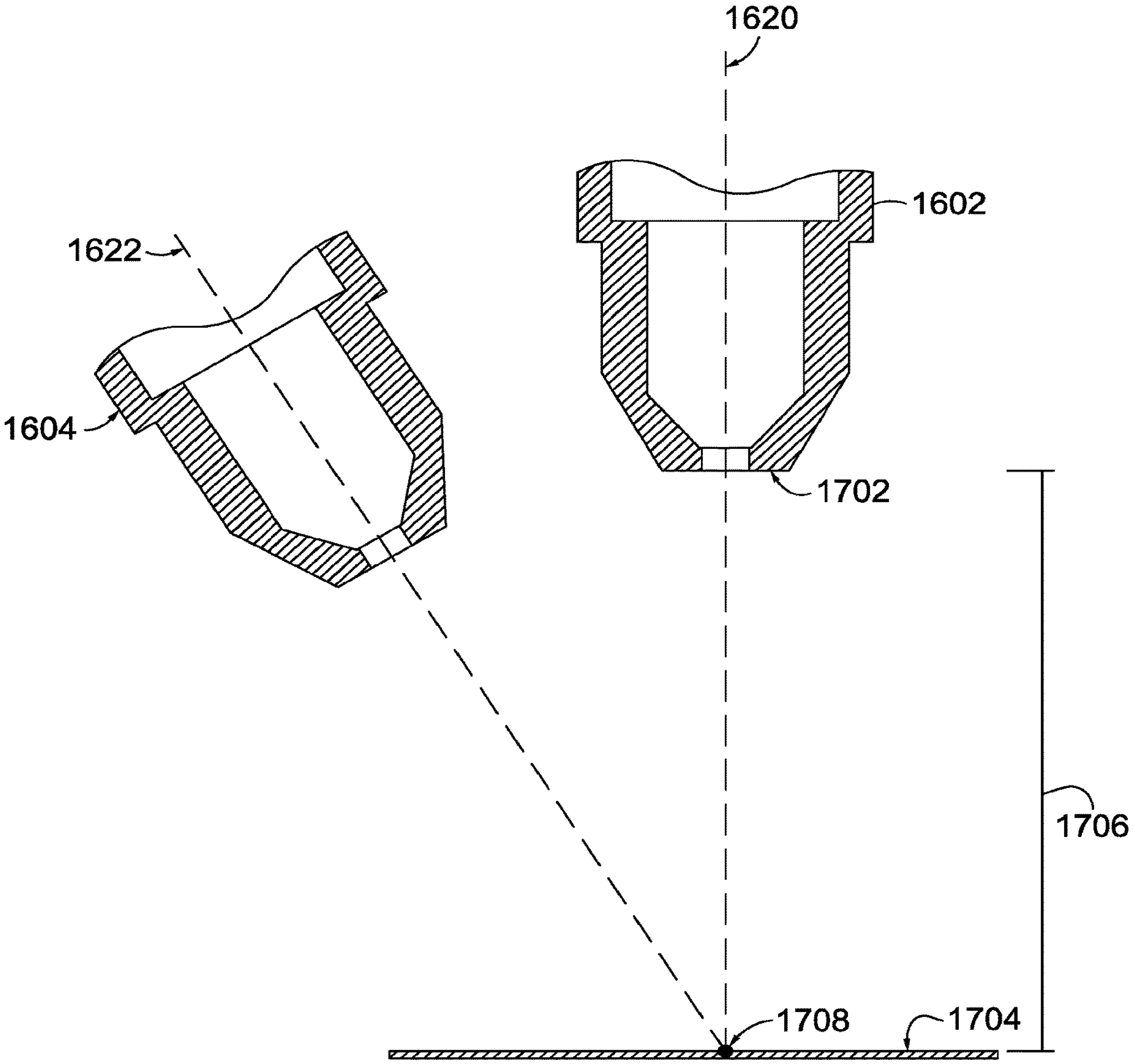
FIG. 17 depicts the first nozzle and the second nozzle of FIG. 16 having a illustrative substrate surface at a distance relative to one or more nozzles.

FIG. 17 depicts the first nozzle and the second nozzle of FIG. 16 having an illustrative substrate surfaces 1704 at a distance 1706 relative to the first nozzle 1602, in accordance with aspects hereof. Specifically, FIG. 17 depicts that a substrate may be positioned within the distance 1706 of the first nozzle 1602 as measured from a distal surface 1702. Is this example, an intersection 1708 of the dispensing axis 1620 and the masking axis 1622 occurs at the substrate surface 1704. However, as depicted in FIG. 16, an intersection of the masking axis and the dispensing axis may occur subsequent to the substrate surface in a material flow direction. Similarly, it is contemplated that the intersection may occur prior to the substrate surface in the material-flow direction. The distance 1706, in an exemplary aspect is greater than 10 cm, 5 cm, and 1 cm. This is in contrast to the previously discussed air horn concepts. An air horn may have an air stream that intersect the material stream, but that intersection occurs in close proximity to the ports expelling the air stream and/or the material stream. The aspect provided herein instead contemplates an intersection (e.g., intersection 1708) that occurs within 10 cm, 5 cm, 1 cm (in both the positive and negative direction) of the surface. Use of a traditional air horn at a distance that would move the air stream and the mask stream to the range provided herein would not provide a reasonable or workable distance for the traditional air horn nozzle. In that example to have the intersection of a traditional air horn stream within the provided ranges herein, the air horn itself would obscure the surface from view and results in a material pattern of such a small size that it would not be practical for application to articles contemplated herein, such as an article of footwear.

Figure 18:
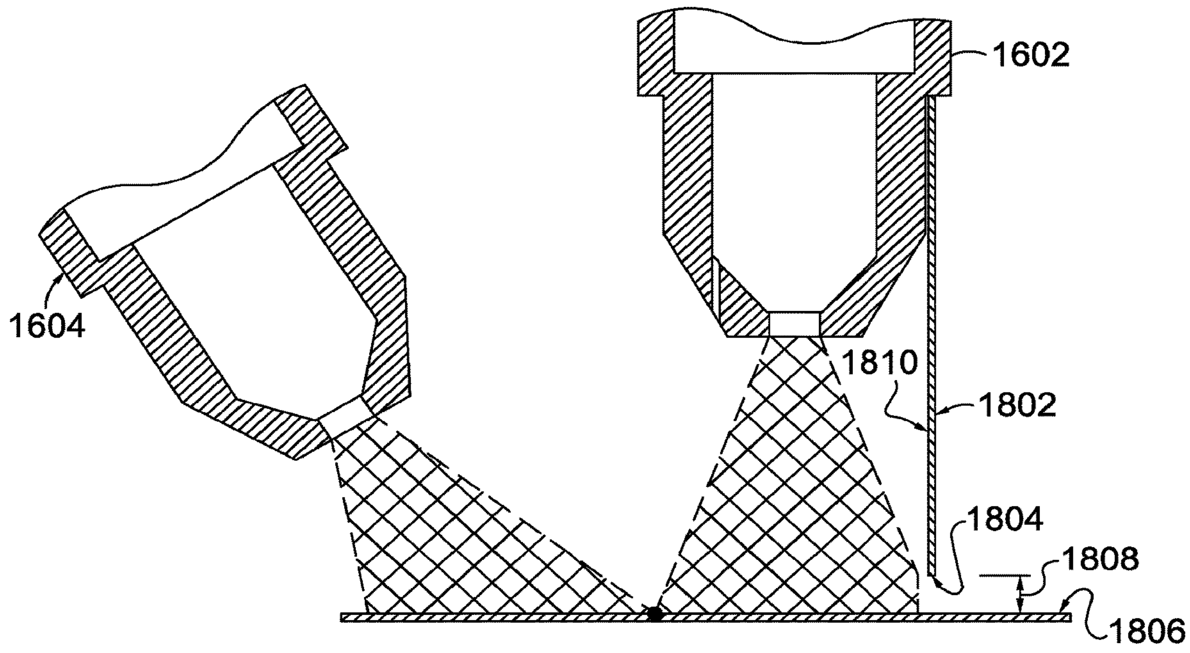
FIG. 18 depicts the first nozzle and the second nozzle of FIG. 16 with the first nozzle having an optional physical mask extension and an optionally integral air-mask port, in accordance with aspects hereof.

FIG. 18 depicts the first nozzle 1602 and the second nozzle 1604 of FIG. 16 with the first nozzle 1602 having an optional physical mask extension 1802 and an optionally integral air-mask port, in accordance with aspects hereof. The physical mask extension 1802 is a tangible element that physically blocks the material spray pattern or interrupts the material spray pattern. The physical mask extension 1802 has a primary surface 1810 that is positioned towards the material spray pattern and the dispensing port. It is the primary surface 1810 that may contact material emitted from the dispensing port to prevent further expansion of the material spray pattern in the direction of the physical mask extension 1802. Unlike an air mask, the physical mask extension 1802 can provide a physical mask to the dispensed material, but it may also require cleaning and other maintenance. Further the physical mask extension 1802 has a distal end 1804 that may be spaced from the substrate surface 1806 by a distance 1808. The distance 1808 may be minimized to provide greater control of the masking effect provided by the physical mask extension 1802; however, the distance 1808 may be 1 mm or greater to prevent physical interference between the distal end 1804 and the substrate surface 1806 as the first nozzle 1602 is moved to follow an application line. If the substrate is a married thickness material and or dimensional in nature, as is common for an article of footwear in exemplary aspect, the distance 1808 is greater than 1 mm. The physical mask extension 1802 may be positioned on a first side of the dispensing port while an air-mask may be positioned on a second side. First it is contemplated that the physical mask extension 1802 is on a first side of the dispensing port on an alignment axis as compared to an air-mask port. The physical mask extension 1802 may be used in connection with an air mask port that is integral to the nozzle to which the physical mask extension 1802 is positioned (e.g., first nozzle 1602). Additionally, it is contemplated that a second nozzle (e.g., the second nozzle 1604) may me positioned opposite of the physical mask extension 1802 relative to the distribution port of the first nozzle. This relative positioning of the air mask and the physical mask extension 1802 may be such that the air mask is implemented when known interference between the mask (e.g., air stream) and the material will occur continuously and the physical mask extension 1802 may be implemented when interference between the mask (e.g., physical element) occurs as an exception (e.g., less than 10% of material volume dispensing results in contact with the mask).

Figure 19:
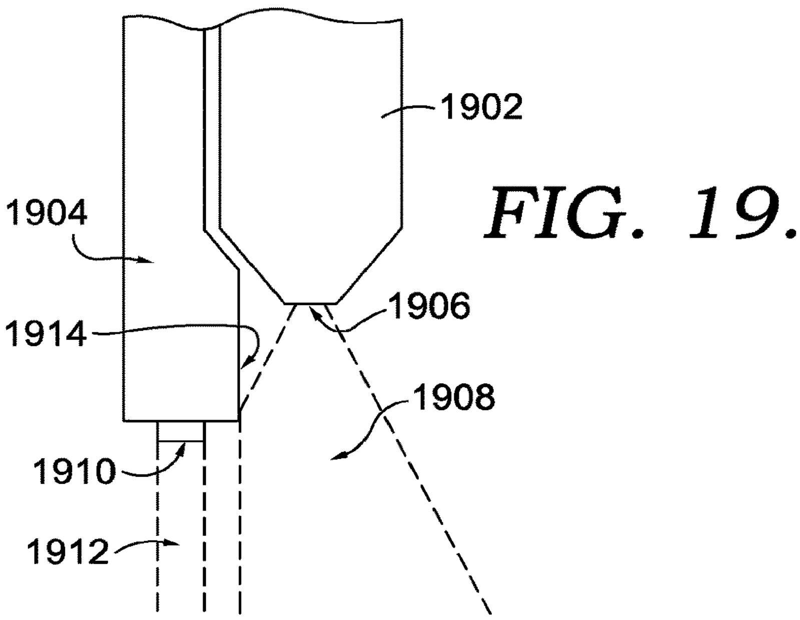
FIG. 19 depicts an additional first nozzle having a dispensing port and a second nozzle having an air-mask port, in accordance with aspects hereof.

FIG. 19 depicts an additional first nozzle 1902 having a dispensing port 1906 and a second nozzle 1904 having an air-mask port 1920 and an integrated physical mask 1914, in accordance with aspects hereof. In this example, the air-mask port 1910 is oriented having a masking axis that is substantially parallel with a dispensing axis of the dispensing port 1906. The second nozzle 1904 is sized and positioned to also serve as a physical mask of a material stream 1908. For example, a prominent surface of the second nozzle 1904 provides a physical masking surface that can enhance, substitute, or augment an air-mask stream 1912. The use of the physical mask 1914 and the air-mask stream 1912 provides a configuration where a majority of material from the material stream 1908 is directed by the air-mask stream 1912 and exceptional material (e.g., errant material from the dispensing port 1906) is masked by the physical mask 1914. The shape and size of the physical mask 1914 is selected to achieve an intended application pattern of the material stream 1908. It is contemplated that the second nozzle 1904 may be moved relative to the first nozzle 1902 to adjust a position of the physical mask 1914 to adjust the material stream 1908. Additionally, it is contemplated that the air-mask stream 1912 and the material stream 1908 may be independently operated and/or varied.

Figure 20:
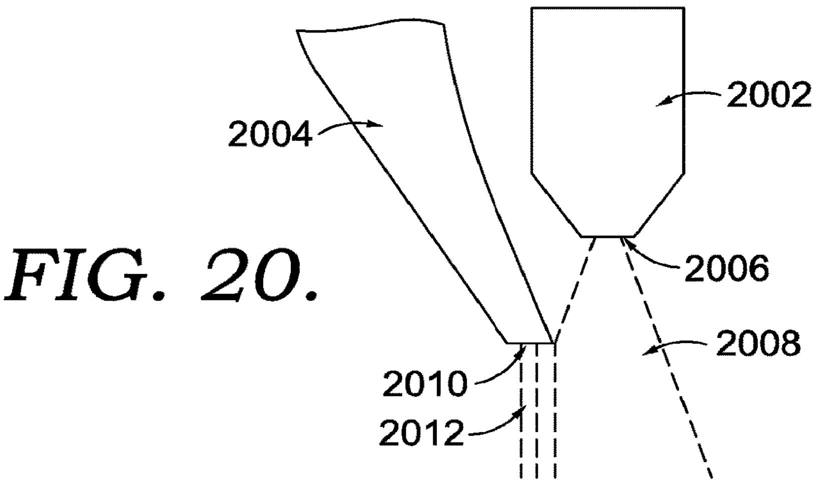
FIG. 20 depicts yet another first nozzle having a dispensing port and a second nozzle having an air-mask port, in accordance with aspects hereof.

FIG. 20 depicts yet another first nozzle 2002 having a dispensing port 2006 and a second nozzle 2004 having an air-mask port 2010, in accordance with aspects hereof. The configuration of FIG. 20 highlights variations in relative positions of the first nozzle 2002 and the second nozzle 2004. For example, the dispensing port 2006 and the air-mask port 2010 are offset in a material flow direction by a distance. This distance may be about 1 mm, 5 mm, 1 cm, 2 cm, 5 cm, or any value there between. An offset in the dispensing port 2006 and the air-mask port 2010, in an exemplary aspect, allows for a concentrated air-mask stream 2012 to be expelled at a point closer to intersection with a material stream 2008. By reducing a distance between the air-mask port 2010 and an intersection of the air-mask stream 2012 and the material stream 2008 through the offsetting of the respective ports, the air-mask stream 2012 may be more effective as a mask to the material stream 2008, in an exemplary aspect. Similarly is contemplated that a lateral position (e.g., left and right in the FIG. 20) may also be adjusted to influence an intersection (e.g., interaction) position of the air-mask stream 2012 and the material stream 2008, in exemplary aspects.

Figure 21:
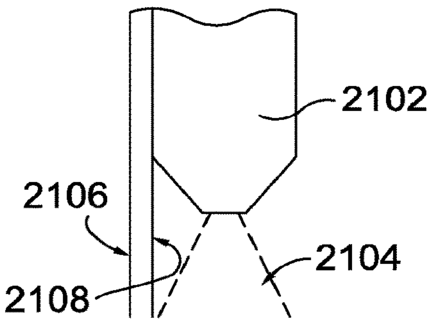
FIG. 21 depicts a first nozzle having a physical mask associated therewith, in accordance with aspects hereof.

FIG. 21 depicts a nozzle 2102 having a physical mask 2106 joined therewith, in accordance with aspects hereof. The physical mask 2106 has a prominent surface 2108 that interacts with a material stream 2104 to adjust the material pattern, in accordance with aspects hereof. The configuration of FIG. 21 highlights that an air-mask stream may be optionally omitted in aspects hereof and/or that an air-mask stream, when included, may be independently and separately operated from the material stream 2104, in aspects hereof.

As such, it is contemplated in the various configurations provided herein that one or more elements (e.g., nozzle, port, physical masks) may be positioned at different locations to influence the material stream. Positioning include vertical and lateral positioning changes. Additionally, positioning also include orientation changes. For example, one element (e.g., a first nozzle) may be rotated relative to another element (e.g., second nozzle). Further yet, it is contemplated that one or more elements may be omitted or added. For example, a first nozzle having a dispensing port may also have an integral air-mask port. In this same example, a second nozzle may be provided that has one or more ports (e.g., a second air-mask port). The air-mask port, the second air-mask port, and the dispensing port may be independently and separately operated, in exemplary aspects.

FIG. 22 depicts the first nozzle 1602 and the second nozzle 1604 of FIG. 16 with the first nozzle 1602 having an optional physical mask 2202 and an optionally third nozzle 2214, in accordance with aspects hereof. While the nozzles from FIG. 16 are depicted and referenced, it is contemplated that any nozzle provided herein may be implemented in any combination. For example, the second nozzle 1604 may be omitted all together in some aspects. Further, while the first nozzle 1602 is depicted in FIG. 22 having the air-mask port (e.g., air-mask port 1608 of FIG. 16), it is contemplated that the air-mask port may be omitted or positioned differently, in alternative aspects.

The physical mask 2202 extends from the first nozzle 1602 (or extends along the first nozzle 1602) in a direction of the spray pattern from the first nozzle 1602. The physical mask 2202 may have a curvature, such as a curvature that parallels the exterior surface of the first nozzle 1602. The curvature may have any diameter, such as a diameter that is greater or lesser than a diameter of the first nozzle 1602. Further, the curved profile of the physical mask 2202, in an exemplary aspect, provides a physical masking surface that closer aligns with a spray pattern of the first nozzle 1602.

The physical mask 2202 includes a primary surface 2220 and an opposite secondary surface 2222. The primary surface 2220 is a surface exposed to the spray pattern of the associated nozzle, such as the first nozzle 1602. The primary surface 2220 serves as a physical mask to control the spray pattern emitted from the associated nozzle. The primary surface 2220 may accumulate material, such as an adhesive, emitted from the associated nozzle. Eventually, accumulated material may interfere with or otherwise disrupt the spray pattern from the associated nozzle in an unintended manner. The accumulated material may prevent an intended spray pattern and resulting application of material on a target surface. Therefore, aspects herein contemplate a physical mask cleaning solution.

A port 2224 directs a fluid 2226, such as compressed air, on the primary surface 2220 to dislodge accumulated material from the primary surface 2220. The fluid 226 is supplied to the port 2224 through a source 2218. The source 2218 may be a tube (e.g., pneumatic line) or other fluid conduit to transfer the fluid 2226 to the port 2224. The fluid 2226 may be supplied from a compressor, a reservoir, or other source. The port 2224, in an exemplary aspect, extends through the physical mask 2202 from the secondary surface 2222 to the primary surface 2220. At the primary surface 2220, the port 2224 is configured (e.g., directed outlet) to direct the fluid 2226 along the primary surface 2220. Stated differently, an air stream is directed to the primary surface 2220 of the physical mask 2202 to remove accumulated material from the primary surface 2220. The fluid 2226 is effective to remove material, such as accumulated material, from the primary surface 2220. In use, it is contemplated that the port 2224 expels the fluid 2226 to clean the primary surface 2220. The fluid 2226 is expelled, in an exemplary aspect, on request. For example, the fluid 2226 may be expelled when the first nozzle 1602 is not expelling a material. Stated differently, the port 2224 operates independently from the first nozzle 1602. The port 2224 operates (e.g., expels air) at times that do not interfere with the spray of material from the first nozzle 1602, such as after the first nozzle 1602 completes a material dispensing operation.

The third nozzle 2214 is depicted in FIG. 22; however, it is optional and may be omitted in some aspects. In examples where the third nozzle 2214 is implemented, the third nozzle 2214 emits an air mask 2212. The third nozzle 2214 expels the fluid from an air-mask port 2210 and is supplied by a supply line 2216. The supply line 2216 is fluidly coupled with a source, such as a compressor, tank, or other supply. The air mask 2212 projects towards the secondary surface 2222. The air mask 2212, in an exemplary aspect, serves as an air mask between a distal end of the physical mask 2202 and the surface to which the material from the first nozzle 1602 is to be applied. When optionally used, the air mask 2212 allows the physical mask 2202 to maintain physical clearance (e.g., offset distance without contact) from the surface to which material is to be applied. By maintaining the physical clearance, interference of the physical mask 2202 and the surface and/or applied material may be avoided as the physical mask 2202 moves relative to the surface.

The third nozzle 2214 is adjustable in position and orientation, such as along any axis 2232 in direction and/or rotation. It is contemplated that a position of the third nozzle 2214 may be adjusted with respect to one or more of the depicted components, such as the first nozzle 1602, the second nozzle 1604, and/or the physical mask 2202. The adjustable position may include an offset distance horizontally from one or more components of FIG. 22. The adjustable position may include an offset distance 2230 in the vertical direction from the substrate to which the air mask 2212 is directed. An orientation, such as an angle formed between the air mask 2212 and the physical mask 2202 may be adjusted and maintained. An orientation, such as an angle 2228 formed between the air mask 2212 and the substrate is also contemplated. The adjustability of position and/or orientation of the third nozzle 2214 allows for the appropriate placement of the air mask 2212 expelled from the air-mask port 2210. This adjustment of position and/or orientation can compensate for varied spray patterns of material from the first nozzle 1602 and/or varied tolerances of errant material from the first nozzle 1602.

Figure 23:
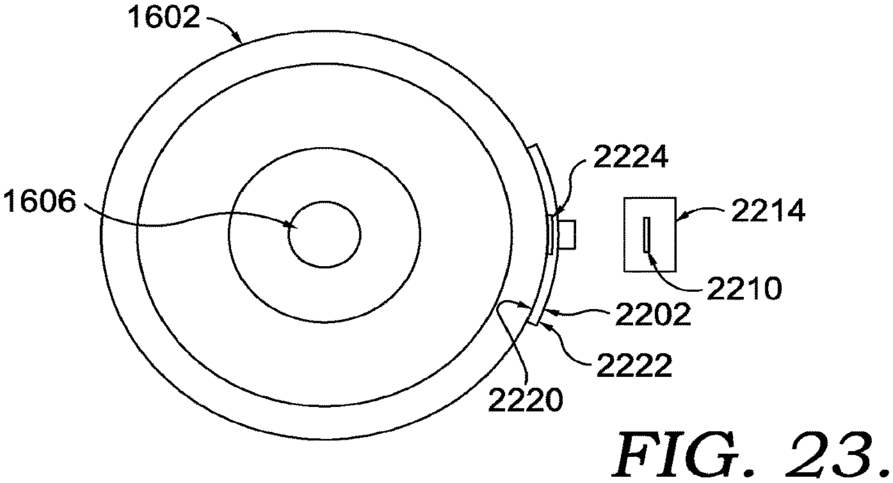
FIG. 23 depicts a bottom-up view of the first nozzle and the third nozzle of FIG. 22, in accordance with aspects hereof.

FIG. 23 depicts a bottom-up plan view of a portion of components from FIG. 22, in accordance with aspects hereof. Specifically, the first nozzle 1602, the physical mask 2202, and the third nozzle 2214 are depicted in FIG. 23. FIG. 23 depicts the physical mask having a curved form that conforms to the curvature of the first nozzle 1602. The curvature of the physical mask 2202 may also conform to a spray pattern emitted from the dispensing port 1606, in an exemplary aspect. For example, the dispensing port 1606 is depicted as a circular port that emits a conical stream. The curvature of the primary surface 2220 of the physical mask 2202 may have a radius that corresponds to a conical radius of the emitted stream from the dispensing port 1606 at an intersection of the emitted stream and the physical mask 2202. Further, while FIG. 23 depicts the primary surface 2220 and the secondary surface 2222 having parallel curved surfaces, it is contemplated that the secondary surface 2222 may have a different (e.g., linear) surface than the primary surface 2220, in exemplary aspects. For example, in an exemplary aspect, the secondary surface has a linear surface such that an interaction with an air mask stream from the third nozzle 2214 forms a straight edge at an intersection with a stream from the dispensing port 1606 beyond the physical mask 2202 distal end. In yet another example, the secondary surface 2222 is a curved surface, as depicted in FIG. 23, to provide a curved intersection profile of the air mask stream from the third nozzle 2214 as it interacts with the emitted stream from the dispensing port 1606 proximate the substrate beyond the distal end of the physical mask 2202. While depicted as being curved, it is contemplated that the primary surface 2220 may alternatively have a different surface configuration in the bottom-up plan view, such as a linear surface.

The port 2224 is depicted as being positioned between the primary surface 2220 of the physical mask 2202 and the dispensing port 1606. The port 2224 is depicted as having a non-circular (e.g., annular quad-sided structure) plan shape. However, it is also contemplated that the port 2224 may have a circular, linear, polygonal, and the like shape. The shape of the port 2224 may be adjusted to complement the physical mask 2202 shape, the primary surface 2220 shape, and/or the spray pattern from the dispensing port 1606.

The air-mask port 2210 is depicted as a rectilinear port on the third nozzle 2214. However, aspects contemplate a port shape forming an air mask having a curved profile, such as a curved profile that match or corresponds with a fluid stream from the dispensing port 1606, in an exemplary aspect. As discussed with respect to FIG. 22, it is contemplated that the third nozzle 2214 may be positioned in any orientation or position relative to other components, such as the first nozzle 1602 and/or the physical mask 2202. The position and orientation movement can help form an effective air mask for controlling the output from the first nozzle 1602 as it interacts with the target substrate.

From the foregoing, it will be seen that this invention is one well adapted to attain all the ends and objects hereinabove set forth together with other advantages which are obvious and which are inherent to the structure.

It will be understood that certain features and subcombinations are of utility and may be employed without reference to other features and subcombinations. This is contemplated by and is within the scope of the claims.

While specific elements and steps are discussed in connection to one another, it is understood that any element and/or steps provided herein is contemplated as being combinable with any other elements and/or steps regardless of explicit provision of the same while still being within the scope provided herein. Since many possible embodiments may be made of the disclosure without departing from the scope thereof, it is to be understood that all matter herein set forth or shown in the accompanying drawings is to be interpreted as illustrative and not in a limiting sense.

The invention claimed is:

1. A nozzle comprising:

a dispensing port positioned on the nozzle and effective to dispense a material by a pressurized fluid stream through the nozzle at the dispensing port, wherein the dispensing port is located on a first plane, perpendicular to the pressurized fluid stream; and an air-mask port, the air-mask port peripherally positioned on the nozzle relative to the dispensing port and effective to expel a pressurized fluid stream through the nozzle at the air-mask port, wherein the air-mask port is on a second plane which is parallel to and offset from the first plane, wherein the cross-sectional area of the air mask port in the second plane is smaller than the cross-sectional area of the dispensing port in the first plane.

2. The nozzle of claim 1, wherein the air-mask port is peripherally offset from the dispensing port by a distance of at least a width of the dispensing port as measured across an alignment axis extending between the air-mask port and the dispensing port.

3. The nozzle of claim 1, wherein the air-mask port is peripherally offset from the dispensing port by a distance of 7 mm or less.

4. The nozzle of claim 1, wherein the material is one selected from an adhesive, a primer, a coating, paint, and a dye.

5. The nozzle of claim 1 further comprising a physical mask that extends from the nozzle.

6. The nozzle of claim 1, wherein the dispensing port comprises a dispensing diameter that is within a range of 3.5 mm to 1.5 mm.

7. The nozzle of claim 6, wherein the air-mask port is peripherally offset from the dispensing port by a distance that is at least 125% the dispensing diameter.

8. The nozzle of claim 7, wherein the air-mask port comprises a masking diameter that is within a range of 1.5 mm to 0.25 mm.

9. The nozzle of claim 1 further comprising a gas knife positioned on a side of the air-mask port that is opposite the dispensing port.

10. The nozzle of claim 9, wherein the gas knife comprises an exit port effective to expel gas through the gas knife at the exit port.

* * * * *